(12) United States Patent
Zoller et al.

(10) Patent No.: US 12,358,122 B2
(45) Date of Patent: Jul. 15, 2025

(54) LOADING DEVICE, LOADING SYSTEM, TRANSPORT SYSTEM, INSTALLATION AND METHOD FOR LOADING THE INSTALLATION

(71) Applicant: E. Zoller GmbH & Co. KG Einstell-und Messgeraete, Pleidelsheim (DE)

(72) Inventors: Alexander Zoller, Pleidelsheim (DE); Christian Pfau, Ingersheim (DE)

(73) Assignee: E. Zoller GmbH & Co. KG Einstell-und Messgeraete, Pleidelsheim (DE)

( * ) Notice: Subject to any disclaimer, the term of this patent is extended or adjusted under 35 U.S.C. 154(b) by 478 days.

(21) Appl. No.: 17/524,780

(22) Filed: Nov. 12, 2021

(65) Prior Publication Data

US 2022/0161379 A1    May 26, 2022

(30) Foreign Application Priority Data

Nov. 20, 2020    (DE) ...................... 10 2020 130 799.3

(51) Int. Cl.
     *B25H 3/04*      (2006.01)
     *B23Q 13/00*      (2006.01)
     *B25H 3/00*      (2006.01)

(52) U.S. Cl.
     CPC ............... *B25H 3/04* (2013.01); *B23Q 13/00* (2013.01); *B25H 3/003* (2013.01)

(58) Field of Classification Search
     CPC ................ B23Q 3/101; B23Q 3/15526; B23Q 3/15513; B23Q 7/1436; B23Q 7/1431;
(Continued)

(56) References Cited

U.S. PATENT DOCUMENTS

| | | | | |
|---|---|---|---|---|
| 4,117,937 | A | * | 10/1978 | Ratti ...................... A47B 57/04 211/189 |
| 6,264,220 | B1 | * | 7/2001 | Pierce ..................... B25H 3/04 280/47.35 |

(Continued)

FOREIGN PATENT DOCUMENTS

| CN | 208289872 U | 12/2018 |
|---|---|---|
| DE | 39 42 600 A1 | 7/1990 |

(Continued)

OTHER PUBLICATIONS

German Search Report of Sep. 27, 2021 issued in corresponding DE Application No. 10 2020 130 799.3 ( and machine translation).

(Continued)

*Primary Examiner* — Patrick D Hawn
(74) *Attorney, Agent, or Firm* — Posz Law Group, PLC

(57) ABSTRACT

A loading device for a loading of an installation, in particular a multi-clamping and measuring and/or presetting station for tools and/or tool holders, and/or a machine tool, in particular includes at least one handling robot, having at least tool holders and/or tool assemblies, having a rollable undercarriage unit and having a storage unit, arranged on the rollable undercarriage unit, for a storage of the tool holders and/or of the tool assemblies,
     wherein the storage unit has at least one holding device at least for an oblique-positioned holding of the tool holders and/or of the tool assemblies relative to a put-up direction of the storage unit.

26 Claims, 10 Drawing Sheets

Figure 1:
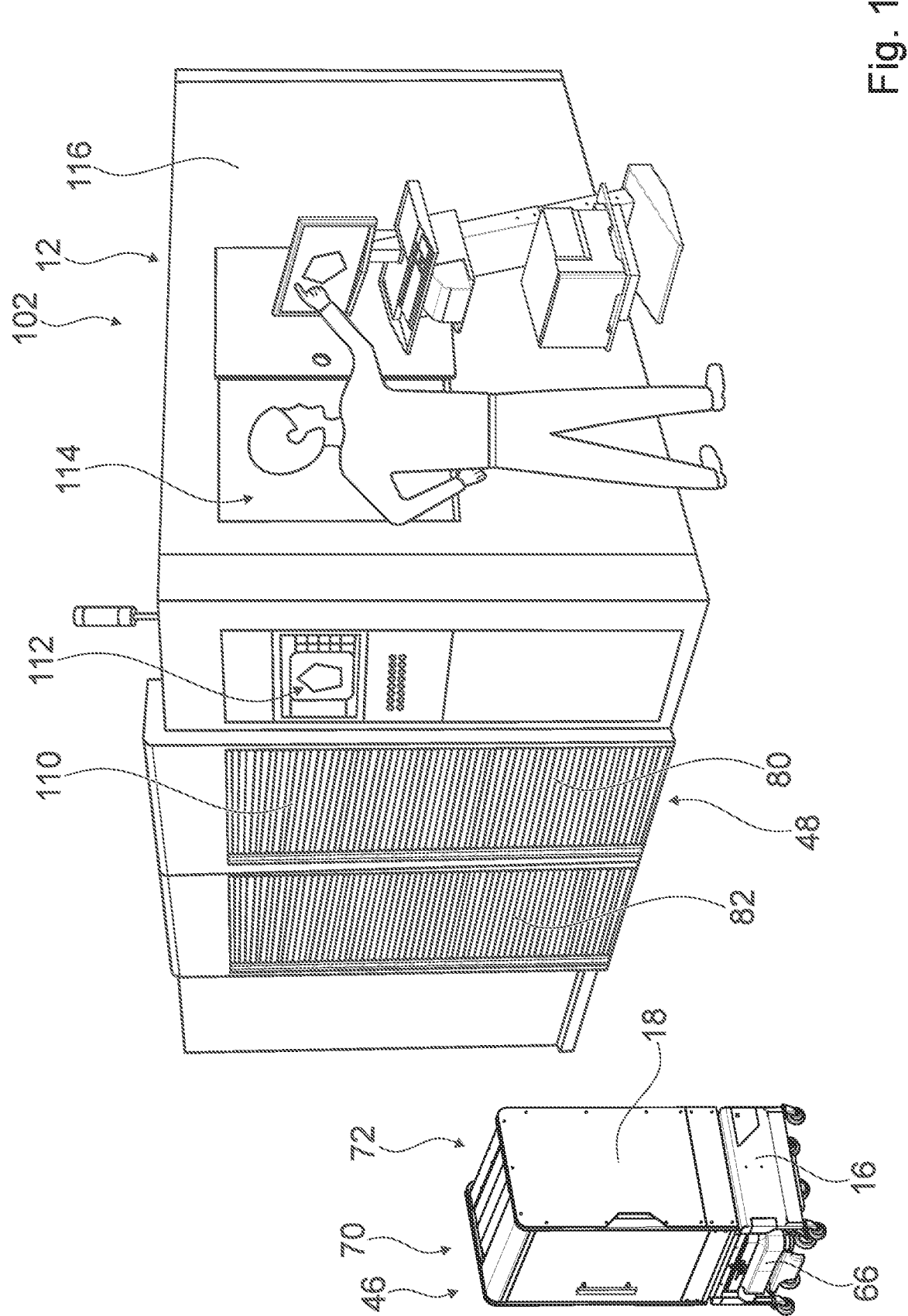

(58) Field of Classification Search
CPC ...... B23Q 7/1442; B23Q 13/00; B25H 3/003; B25H 3/04
See application file for complete search history.

(56) References Cited

U.S. PATENT DOCUMENTS

| | | | | |
|---|---|---|---|---|
| 6,554,561 | B2* | 4/2003 | Jager | B23P 19/001 |
| | | | | 414/795.8 |
| 6,838,892 | B2* | 1/2005 | Suzuki | H01L 21/67736 |
| | | | | 324/756.01 |
| 7,311,488 | B2* | 12/2007 | Park | H01L 21/67736 |
| | | | | 414/663 |
| 10,710,233 | B2* | 7/2020 | Zoller | F16B 2/22 |
| 11,052,500 | B2* | 7/2021 | Lachenmeier | B25J 9/0093 |
| 11,366,452 | B2* | 6/2022 | Zoller | G05B 19/4097 |
| 11,407,073 | B2* | 8/2022 | Geissler | B66F 9/0755 |
| 2018/0169944 | A1 | 6/2018 | Hofmann et al. | |
| 2018/0326623 | A1 | 11/2018 | Winzinger | |
| 2019/0232448 | A1 | 8/2019 | Mayr et al. | |
| 2020/0306903 | A1 | 10/2020 | Hediger | |
| 2020/0324976 | A1 | 10/2020 | Diehr et al. | |
| 2020/0391335 | A1 | 12/2020 | Zoller et al. | |
| 2021/0346998 | A1* | 11/2021 | Geissler | B66F 9/07586 |
| 2022/0362896 | A1* | 11/2022 | Kienberger | B23Q 3/15539 |
| 2023/0138196 | A1* | 5/2023 | Zoller | B65G 65/00 |
| | | | | 483/1 |
| 2023/0264308 | A1* | 8/2023 | Jung | B23Q 3/15539 |
| | | | | 483/1 |
| 2023/0415287 | A1* | 12/2023 | Yasugi | B23Q 3/15539 |

FOREIGN PATENT DOCUMENTS

| | | | |
|---|---|---|---|
| DE | 43 25 774 A1 | 2/1995 | |
| DE | 10 2011 054 890 A1 | 5/2013 | |
| DE | 202015103952 U1 * | 12/2016 | ............... B25H 3/00 |
| DE | 10 2017 119 107 A1 | 2/2019 | |
| DE | 10 2017 131 003 A1 | 6/2019 | |
| DE | 10 2018 201 426 A1 | 8/2019 | |
| DE | 10 2018 109 744 A1 | 10/2019 | |
| DE | 202020105307 U1 * | 11/2020 | ............. B23Q 13/00 |
| DE | 10 2019 115 607 A1 | 12/2020 | |
| DE | 102022000594 A1 * | 8/2023 | |
| EP | 3 756 889 A1 | 12/2020 | |
| EP | 4124408 A1 * | 2/2023 | ......... B23Q 3/15536 |
| JP | 2009-291913 A | 12/2009 | |

OTHER PUBLICATIONS

Partial European Search Report issued Mar. 18, 2022 in European Patent Application No. 21207499.1 (with machine English translation).

* cited by examiner

LOADING DEVICE, LOADING SYSTEM, TRANSPORT SYSTEM, INSTALLATION AND METHOD FOR LOADING THE INSTALLATION

CROSS REFERENCE TO RELATED APPLICATION

This application is based on and incorporates herein by reference German Patent Application No. DE 10 2020 130 799.3 filed on Nov. 20, 2020.

STATE OF THE ART

The invention concerns a loading device for a loading of an installation, a loading system with a loading device, a transport system with a loading device, an installation with at least one loading device, and a method for loading the installation.

A loading device for a loading of an installation with tool holders and/or with tool assemblies, having a rollable undercarriage unit and having a storage unit, arranged on the rollable undercarriage unit, for a storage of the tool holders and/or of the tool assemblies has already been proposed.

The objective of the invention is in particular to provide a generic device having advantageous characteristics in regard to providing tool holders and/or tool assemblies for an installation that is operated by a handling robot.

Advantages of the Invention

The invention is based on a loading device for a loading of an installation, in particular a multi-clamping and measuring and/or presetting station for tools and/or tool holders and/or a machine tool, which in particular includes at least one handling robot handling at least tools, tool holders and/or tool assemblies, comprising at least tool holders and/or tool assemblies, comprising a rollable undercarriage unit and comprising a storage unit, arranged on the rollable undercarriage unit, for a storage of the tool holders and/or of the tool assemblies.

It is proposed that the storage unit comprises at least one holding device at least for an oblique-positioned holding of the tool holders and/or of the tool assemblies relative to a put-up direction of the storage unit, and in particular relative to a depth direction of the storage unit that runs perpendicularly to the put-up direction. This in particular allows obtaining especially advantageous providing of the tool holders and/or of the tool assemblies to the installation operated by the handling robot. In particular, in this way a providing of the tool holders and/or of the tool assemblies is enabled that is particularly advantageous for a cinematic of the handling robot, in particular while at the same time advantageously maximizing a capacity of the storage unit, in particular relative to external measurements of the storage unit, which are often limited or predetermined by standards and/or by safety regulations. The proposed implementation of the storage unit furthermore allows achieving a holding of the tool holders and/or of the tool assemblies that is secure, in particular loss-proof, positionally fixed and/or without risk of injury, also during a movement of the rollable undercarriage unit. Moreover, reliable, easy and quick manual loading and/or manual removal of the tool holders and/or of the tool assemblies into/out of the storage unit are/is achievable by the proposed implementation of the storage unit.

A "loading device" is in particular intended to mean a supply device for supplying a plurality of tool holders and/or of tool assemblies for removal by the automated handling robot. The loading device is in particular embodied as a mobile loading device. A "handling robot" is in particular to mean an industrial robot, preferably an articulate-arm robot, which in particular has at least three, preferably at least four, preferentially at least five and particularly preferentially at least six robot joints, which are movable independently from one another, and has a handling device and/or a manipulator. In particular, the handling robot is at least configured for handling a material flow from and/or to the holding device of the loading device. In particular, the handling robot is at least configured for handling a material flow from and/or to at least one operative point of the installation. An operative point may in particular be at least a portion of an element and/or of a component of the installation, which is at least configured to execute a functional work step. In particular, the handling robot comprises at least one gripper unit, which is at least configured for gripping a tool, a tool holder and/or a tool assembly. The handling robot preferably comprises at least one robot-controlling unit. The robot-controlling unit in particular comprises a specifically programmed robot-controlling device, which is configured to control, regulate and/or select activities and/or movements of the robot and/or at least of a subcomponent of the handling robot. The robot-controlling unit preferably comprises at least one operator interface, in particular for influencing a movement at least of a subcomponent of the robot and/or for influencing the programming of the robot-controlling device. Preferably the handling robot comprises at least one sensor unit for determining at least one ambient parameter. The sensor unit may in particular comprise at least one force and/or momentum sensor, at least one sensor for electromagnetic waves, at least one sound sensor, at least one pressure sensor, at least one vibration sensor, at least one gyro sensor, at least one humidity sensor and/or at least one temperature sensor. The handling robot is in particular configured, when handling the tools, the tool holders and/or the tool assemblies, to re-grip at least once, for example between holding a tool holder by an underside (shaft) of the tool holder and holding the tool holder via gripping grooves of the tool holder which are arranged along a circumference of the tool holder.

By an "installation" is in particular a technical installation and/or a machine installation to be understood. In particular, the installation, preferably the technical installation, is realized as a planned and/or systematic combination of apparatuses, devices and/or machines interconnected in regard to functionality, and/or to controlling and/or safety technology. Preferentially, the installation is implemented as a multi-clamping and measuring and/or presetting station like the one described in the German patent application having the application number 10 2019 115 607.6 or as a machine tool. By a "multi-clamping and measuring and/or presetting station" is in particular an apparatus to be understood which is at least configured to in particular at least partly simultaneously load a plurality of identical and/or preferably different tool holders with tools, or to in particular at least partly simultaneously remove tools out of a plurality of identical and/or preferably different tool holders. In particular, the multi-clamping and measuring and/or presetting station is at least configured to at least partly simultaneously remove a tool from a tool holder while fastening another tool in another tool holder. In particular, the multi-clamping and measuring and/or presetting station is at least configured for at least partly simultaneously removing a tool from a tool holder or fastening a tool in a tool holder and measuring and/or presetting another tool in another tool holder. In particular, the installation comprises the handling robot. "Configured" is in particular to mean specifically programmed, designed and/or equipped. By an object being configured for a certain function is in particular to be understood that the object fulfills and/or executes said certain function in at least one application state and/or operation state.

By a "tool holder" is in particular a component to be understood which is configured for an accommodation of a tool and for a connection of the tool to a machine. In particular, the tool holder is embodied as a tool-machine interface. Preferably the tool holder is implemented as a tool chuck, for example as a shrink chuck, as a hydraulic-expansion chuck, as a compression-clamp chuck, as a collet chuck, or the like. The tools are implemented as machining tools for the use on CNC machines. For example, the tools may be embodied as shaft tools, preferably as rotary shaft tools, for example drills, milling tools, profiling tools and/or reamers, a shaft of the shaft tool being preferably configured for a mounting in a tool holder. By a "tool assembly" is in particular a fix combination of tool and tool holder to be understood.

The rollable undercarriage unit in particular comprises a frame for receiving a weight of a filled storage unit. The rollable undercarriage unit in particular comprises several, preferably four, rollers. The rollers are in particular non-driven. However, it is alternatively also conceivable that the loading device comprises an integral drive unit for driving a roller or several rollers of the rollable undercarriage unit. The storage unit is in particular closable all around (on all sides). The storage unit is in particular configured to forestall an access to objects arranged in the storage unit. In particular during a transport of sharp-edged or sharp-cutting tools, this advantageously allows preventing injuries caused by inadvertent contact with the tools. In particular, the combination of the storage unit and the rollable undercarriage unit is optimized at least regarding manual drivability, at least regarding tilt safety and/or at least regarding available capacity for tool holders, tool assemblies and/or tools having sizes and/or formats customary in the respective field.

The holding device is configured for a positionally fix, preferably tilt-safe and/or slip-proof, holding of the tool holders and/or of the tool assemblies within the, preferably roundabout closable, storage unit. In particular, the holding device comprises at least one holding place, preferably a plurality of holding places, for receiving respectively one tool holder or respectively one tool assembly. Preferably several holding places are arranged in the holding device side by side in a row along a straight line. Preferably several rows of holding places are arranged in the holding device above one another. In particular, the holding places of the rows of holding places which are arranged above one another are arranged directly above each other or are arranged vertically offset to each other in a regular or irregular manner. In particular, the holding device is implemented like a rake, wherein between two neighboring tines of the rake in each case a holding place is realized. In particular, side regions of a tine that respectively delimit a holding place are configured to engage into a thus designated groove of the tool holder or of the tool assembly, for example into a gripping groove of the tool holder or of the tool assembly. In particular, the holding device contacts the tool holder or the tool assembly only in one point along a longitudinal extent of the tool holder or of the tool assembly. However, alternatively it is also conceivable that the holding device forms two or more contact surfaces along the longitudinal extent of the tool holder or of the tool assembly. For example, the tool holders or tool assemblies are in such a case contacted and held by the holding device above and below a gripping collar of the respective tool holder or of the respective tool assembly.

By an oblique-positioned holding of a tool holder or a tool assembly is a holding of the tool holder or of the tool assembly to be understood in which the tool holder or the tool assembly, preferably a rotary axis of the tool holder or of the tool assembly that is designated for a regular use of the tool holder or of the tool assembly, is positioned and held in a manner different than an orientation in parallel to the put-up direction of the storage unit, in particular to the vertical direction, and differs from an alignment perpendicularly to the put-up direction of the storage unit, in particular to the vertical direction. In particular, a holding angle of the tool holder held in an oblique-positioned manner or of the tool assembly held in an oblique-positioned manner, in particular an angle of the rotary axis of the tool holder or of the tool assembly that is designated for the regular use of the tool holder or of the tool assembly, with respect to the put-up direction of the storage unit, in particular to the vertical direction, differs from (approximately) 0°. In particular, the holding angle of the tool holder held in an oblique-positioned manner or of the tool assembly held in an oblique-positioned manner, in particular the angle of the rotary axis of the tool holder or of the tool assembly that is designated for the regular use of the tool holder or of the tool assembly, with respect to the put-up direction of the storage unit, in particular to the vertical direction, differs from (approximately) 90°. In particular, the holding angle of the tool holder held in an oblique-positioned manner or of the tool assembly held in an oblique-positioned manner, in particular the angle of the rotary axis of the tool holder or of the tool assembly that is designated for the regular use of the tool holder or of the tool assembly, with respect to the put-up direction of the storage unit, in particular to the vertical direction, differs from (approximately) 90°. In particular, the holding angle of the tool holder held in an oblique-positioned manner or of the tool assembly held in an oblique-positioned manner, in particular the angle of the rotary axis of the tool holder or of the tool assembly that is designated for the regular use of the tool holder or of the tool assembly, with respect to the put-up direction of the storage unit, in particular to the vertical direction, is at least 5°, preferably at least 10° and preferentially at least 15°. In particular, the holding angle of the tool holder held in an oblique-positioned manner or of the tool assembly held in an oblique-positioned manner, in particular the angle of the rotary axis of the tool holder or of the tool assembly that is designated for the regular use of the tool holder or of the tool assembly, with respect to the put-up direction of the storage unit, in particular to the vertical direction, is maximally 80°, preferably maximally 75°, advantageously no more than 50°, preferentially no more than 30° and especially preferentially maximally 20°. Particularly preferably the holding angle of the tool holder held in an oblique-positioned manner or of the tool assembly held in an oblique-positioned manner, in particular the angle of the rotary axis of the tool holder or of the tool assembly that is designated for the regular use of the tool holder or of the tool assembly, with respect to the put-up direction of the storage unit, in particular to the vertical direction, is in a range between approximately 10° and 20° (e.g. 15°).

It is furthermore proposed that the holding device comprises at least one holding place, which is implemented in such a way that an underside of a tool holder that has been, in particular appropriately, laid into the holding device and/or of a tool assembly that has been, in particular appropriately, laid into the holding device points at least partly toward a loading and/or unloading opening which is arranged at least partly sidewise on the storage unit. This in particular allows achieving an especially advantageous providing of the tool holders and/or of the tool assemblies for the installation that is operated by the handling robot. In particular, in this way a providing of the tool holders and/or of the tool assemblies is achievable that is especially advantageous for a cinematic of the handling robot, in particular while at the same time advantageously maximizing a capacity of the storage unit, in particular relative to external measurements of the storage unit, which are often limited and/or predetermined by standards and/or by safety regulations. Preferably several holding places, preferentially all holding places, of the holding device are implemented in the manner described above. Preferably several holding places, preferentially all holding places, of the holding device have at least substantially identical orientations. Preferably several holding places, preferentially all holding places, of the holding device are implemented at least substantially identically. "Substantially identical/identically is in particular to mean identical/identically within manufacturing tolerances and/or clearance tolerances. An underside of the tool holder or of the tool assembly is implemented as the side of the tool holder or of the tool assembly that is configured to be connected to a machine tool. Preferably the underside of the tool holder or of the tool assembly is arranged such that it is situated along the rotary axis opposite a work region of the tool assembly or to a receiving region of the tool holder. The term "appropriately laid in" is in particular to mean laid in in the designated manner. In particular, there is only one way in which the tool holder or the tool assembly can be laid into the holding place appropriately.

In particular, the loading and/or unloading opening forms a lock opening of the storage unit. In particular, the side of the storage unit comprising the loading and/or unloading opening extends parallel to the vertical direction. In particular, the loading and/or unloading opening of the storage unit extends over a large portion of the side of the storage unit. In particular, the loading and/or unloading opening extends at last partly over an upper side of the storage unit. In particular, a horizontal component of an imaginary prolongation (subjected to an orthogonal vector resolution) of the designated rotary axis of a tool holder or tool assembly laid into the holding device is at least in a horizontal plane at least substantially perpendicular to an opening plane of the loading and/or unloading opening and/or on a lateral plane of the storage unit which extends parallel to the side with the loading and/or unloading opening. In particular, the horizontal component of the imaginary prolongation (subjected to an orthogonal vector resolution) of the designated rotary axis of the tool holder or tool assembly laid into the holding device is at least in a horizontal plane free of an intersection point with an (infinite) plane, wherein a lateral delimitation of the storage unit, delimiting the storage unit in a direction that is a width direction when viewed from the loading and/or unloading opening, extends within said (infinite) plane. In particular, the storage unit comprises a closure element, which is preferably configured to close the loading and/or unloading opening, preferably completely. In particular, the closure element is embodied as a vertical slide door, preferably as something like a roller blind, which is preferably openable in the vertical direction upwards or in the vertical direction downwards. In particular, the imaginary prolongation of the designated rotary axis of the tool holder or tool assembly laid into the holding device intersects with the closure element in an acute angle to the vertical direction or in an obtuse angle to the vertical direction, preferably in an angle corresponding to the holding angle.

It is further proposed that the holding place is implemented in such a way that the underside of the tool holder laid into the holding device and/or of the tool assembly laid into the holding device points at least partly downwards, in particular at least partly downwards when viewed in the vertical direction. In particular, the holding place is implemented in such a way that the underside of the tool holder laid into the holding device and/or of the tool assembly laid into the holding device points obliquely downwards, in particular obliquely downwards with the holding angle.

It is moreover proposed that the holding device comprises a plurality of holding places, which are implemented at least substantially identically to one another and which are arranged at least substantially next to each other horizontally and at least substantially above one another (directly or offset) vertically. In this way, in particular an especially advantageous providing of the tool holders and/or of the tool assemblies for the installation operated by the handling robot is achievable. In particular, in this way a providing of the tool holders and/or tool assemblies is achievable that is especially advantageous for a cinematic of the handling robot, in particular while at the same time maximizing the capacity of the storage unit. In particular, the holding places are oriented at least substantially identically. In particular, the holding devices are removable/exchangeable from the storage unit.

In particular, the holding devices are height-adjustable/positionable in the storage unit at different heights.

In addition, it is proposed that the storage unit comprises at least one further holding device at least for an upright holding of tools, which can in particular be combined with tool holders held in the holding device. As a result, in particular in addition to an especially advantageous providing of the tool holders for the installation operated by the handling robot, a simultaneous providing of the tools is enabled, which is in particular especially advantageous for a cinematic of the handling robot. By an "upright holding" is in particular a holding of the tools to be understood in which a designated rotary axis of the tools, in particular a tool rotary axis, is oriented at least substantially parallel to the put-up direction of the storage unit, preferably to the vertical direction. In particular, in the upright holding a tool shaft of the tool points in the vertical direction downwards.

If the further holding device comprises at least one holding place, preferably a plurality of holding places, which is/are arranged in the put-up direction above the holding place of the holding device, in particular above the plurality of identically implemented and oriented holding places of the holding device, this allows obtaining an especially advantageous combination of effective space utilization and adaptation to a cinematic of a handling robot which is configured for laying the tool holders and the tools into the storage unit and to remove them from the storage unit. In particular, in the described arrangement of the further holding device, loading and/or unloading of the further holding device may be effected advantageously at least partly via the portion of the loading and/or unloading opening that extends over the upper side of the storage unit. In particular, the holding places of the further holding device are arranged in a row or several rows, which is/are preferably at least substantially parallel to the rows of holding places of the holding device. It is conceivable that the further holding device comprises several rows of holding places, which are in particular arranged behind one another in a depth direction of the storage unit. In particular, the further holding devices are removable/exchangeable out of the storage unit. In particular, the further holding devices are height-adjustable/positionable in the storage unit at different heights. As a result, advantageously an arrangement of the holding devices and the further holding devices is flexibly adaptable to different tool sizes and/or tool holder sizes which are to be expected.

If moreover the at least one holding place of the further holding device, preferably all holding places of the further holding device, comprises/comprise a universally loadable tool snap-holder, a particularly high degree of application flexibility is advantageously achievable. Advantageously, a great number of different tools can be accommodated in the storage unit without extensive re-structuring efforts, respectively without great packing efforts. In particular, a universally loadable tool snap-holder can be loaded with different tools having different shaft diameters. In particular, the tool snap-holder comprises a clamping mechanism, which is configured to clamp, and thus hold, the tool shaft of a tool from at least two sides in a receiving region of variable size formed by the holding place of the further holding device.

If beyond this the tool snap-holder comprises a clamping mechanism for a fixation of the tool in the holding place of the further holding device, which can be operated via a movement of a robot arm of a handling robot along a movement path, automated loading and/or removal of the universally loadable further holding device and thus a particularly favorable adaptation to a cinematic of the handling robot is advantageously achievable. Advantageously in this way particularly simple and secure operation of the loading device is enabled. In particular, the handling robot is configured for tensioning the clamping mechanism, for inserting the tool into the universally loadable holding place and for then releasing the clamping mechanism. In particular, the clamping mechanism comprises for this purpose an application element, which is directly operated by the handling robot when inserting or removing the tool; or the clamping mechanism is alternatively free of an application element for a direct operation of the clamping mechanism, the handling robot being in such a case preferably configured to operate the clamping mechanism indirectly via a movement of the tool, for example via an abutment of the tool shaft on a portion of the clamping mechanism. Preferably the handling robot is configured to push a snap of the clamping mechanism of the tool snap-holder open by means of the tool shaft open (thus tensioning the snap), such that a release of the tool will automatically result in the snap snapping closed, thus creating a holding.

In one aspect of the invention, which may be considered on its own or also in combination with at least one further aspect of the invention, in particular in combination with any number of further aspects of the invention, it is proposed that the loading device comprises an at least semi-automated, preferably fully automated, and/or sensor-controlled docking device for a docking of the loading device in a place of the installation that is configured for docking. In this way in particular an especially advantageous providing of the tool holders and/or the tool assemblies is achievable for the installation that is operated by the handling robot. In particular, a providing of the tool holders, the tools and/or the tool assemblies, which is especially advantageous for a cinematic of the handling robot, is enabled by a positioning that is as precise as possible relative to the installation. Advantageously a high level of operational reliability of an automated operation of the loading device can be obtained.

In particular, the installation comprises a lock device. In particular, the lock device is configured for a transfer of the tool holders, the tools and/or the tool assemblies between the loading device and the handling robot. In particular, the lock device forms the place of the installation that is designated for docking. In particular, the docking device is configured for a precisely positioned of the loading device, in particular of the storage unit and/or of the rollable undercarriage unit (in a docking position of the installation). By a "sensor-controlled docking device" is in particular a docking device to be understood which recognizes and/or monitors a position, situation and/or movement of the loading device, or at least of the storage unit of the loading device and, on the basis of the sensor data, controls the installation, in particular the handling robot and/or the loading device, in particular a movement of the loading device and/or an opening position of the closure element of the loading device.

If the docking device comprises at least one docking sensor, which is configured to detect a correct docking of the loading device relative to the installation, an especially advantageous providing of the tool holders and/or of the tool assemblies is achievable for the installation that is operated by the handling robot. Advantageously a high level of operational reliability of an automated operation of the loading device can be obtained. It is advantageously possible to detect and/or avoid erroneous positioning of the storage unit relative to the installation. In particular, the docking sensor may be embodied as a camera, as a distance and/or position sensor, like for example a radar or lidar sensor, and/or as a contact sensor or something like that. In particular, the docking sensor checks whether the loading device is correctly positioned in a docking region of the installation, i. e. in the lock. The docking region in particular comprises all positions in the lock from which the handling robot can access without encumbrance the (all) tools and tool holders in the loading device. In particular, the docking sensor is arranged at least partly or completely on the installation. Alternatively or additionally, the docking sensor could also be arranged at least partly or completely on the loading device, for example on the storage unit.

It is further proposed that the storage unit comprises a loading and/or unloading opening, which is arranged at least partly sidewise on the storage unit, and comprises a lockable closure unit closing the loading and/or unloading opening, wherein a locking state of the closure unit depends on a measurement signal of the docking sensor. This advantageously allows achieving an especially high safety level. It is advantageously possible to prevent an opening of the storage unit outside places which are explicitly designated therefor, like for example the docking region. In this way unauthorized access to the contents of the storage unit, in particular the tools, involving the risk of injuries, can be prevented. In particular, the closure unit comprises the closure element. In particular, the closure element can be locked and unlocked by means of a locking element of the closure unit. In particular, the closure unit is unlockable and/or the closure element is openable only if the measurement signal of the docking sensor confirms that the loading device is arranged in the docking region of the installation. In particular, the closure element can be operated, in particular opened and closed, pneumatically or electrically. In particular, the closure unit is automatically unlocked and/or the closure element is automatically opened if the measurement signal of the docking sensor confirms that the loading device is arranged in the docking region of the installation. In particular, the closure unit is automatically locked and/or the closure element is automatically closed if the measurement signal of the docking sensor confirms that the loading device is situated outside the docking region of the installation.

Furthermore it is proposed that the docking device comprises a fixation unit configured, in a docking at the installation, to fix at least the rollable undercarriage unit and/or at least the storage unit in the place of the installation that is designated for docking, in particular in the docking region. This advantageously allows obtaining a high level of operational reliability of an automated operation of the loading device. It is advantageously possible to avoid erroneous positioning or a position change of the storage unit relative to the installation during a loading process. In particular, the fixation unit is arranged at least partly on the installation. In particular, the fixation unit is arranged at least partly on the storage unit and/or on the rollable undercarriage unit. The fixation unit may comprise, for example, grippers, magnets, abutments, latch mechanisms or the like for effecting the fixation.

It is also proposed that the docking device comprises at least one interface, in particular a pneumatic and/or electronic interface, which is configured at least for a transmission of a drive energy for an, in particular motoric and/or pneumatic, opening and/or closing movement of a closure unit, in particular of the closure element, that closes the loading and/or unloading opening of the storage unit, and/or for an external controlling of the opening and/or closing movement of the closure unit, in particular of the closure element. In this way a high level of operational reliability is advantageously achievable, in particular as advantageously an opening of the closure element is possible only if the storage unit is situated in a docking region or if the storage unit is supplied with an external drive energy otherwise. As a result, inadvertent or unauthorized opening of the closure element during a transport movement of the storage unit, for example by the rollable undercarriage unit, is advantageously avoidable. Preferably the closure element is operable only via the interface. The loading device, in particular the storage unit and/or the rollable undercarriage unit, in particular comprises a drive motor for driving the closure element, preferably for a movement of the closure element between an open state and a closed state. In particular, the drive motor is embodied as an electromotor or as a pneumatic motor. Preferably the loading device itself, in particular a mobile part of the loading device, is free of an energy source and/or free of a control unit configured for an energy supply and/or for a controlling of the drive motor. In particular, the installation comprises at least one connection element, which is configured for a connection to the interface, preferably for a transmission of the drive energy and/or of the controlling signals for the drive motor. In particular, the installation comprises an energy source and/or a control unit, which is configured for an energy supply and/or for a controlling of the drive motor that is arranged in the mobile part of the loading device. Alternatively it is however also conceivable that the drive motor is also arranged on the installation, which means that in particular the opening or closing movement of the closure element is generated externally. In particular, in the place of the installation that is designated for docking, in particular in the docking region, the interface connects, preferably automatically, to the corresponding terminals of the installation.

Beyond this it is proposed that the docking device, in particular the installation and/or the loading device, preferably the storage unit and/or the rollable undercarriage unit, comprise/s at least one identification element, for example an RFID chip, a barcode, a QR code, etc., which is configured to permit automatic identification of the respective loading device, in particular of the respective storage unit, by the installation. This advantageously allows achieving a high level of operational safety. In particular, the installation comprises a read-out element, for example an RFID reader, a barcode reader, etc. In particular, the read-out element is configured to automatically read out the identification element after confirmation of docking by the docking sensor or during a docking process. Alternatively it is conceivable that the identification of the respective loading device, in particular the respective storage unit and/or the respective rollable undercarriage unit, is done already before a start of the docking process, in particular via remote identification. Preferably at least one passive identification element, like the RFID chip, the barcode, the QR code, etc., is assigned to the respective loading device, in particular the respective storage unit and/or the respective rollable undercarriage unit, while an active read-out element, like the RFID reader, the barcode reader, etc., is assigned to the installation.

It is moreover proposed that the storage unit comprises, in addition to a primary loading and/or unloading opening, at least one manually openable and closable secondary loading and/or unloading opening. This advantageously allows achieving high fail-safety and/or a simple possibility of maintenance and/or error repair. In particular, the primary loading and/or unloading opening is implemented as a lock opening. In particular, the primary loading and/or unloading opening is the above-described loading and/or unloading opening. In particular, the secondary loading and/or unloading opening is implemented as a maintenance and/or failure-case opening. In particular, the secondary loading and/or unloading opening is provided exclusively for failure and/or maintenance cases. The secondary loading and/or unloading opening is preferably arranged on a side of the storage unit that is situated opposite the primary loading and/or unloading opening. Preferably the primary loading and/or unloading opening and/or the secondary loading and/or unloading opening are/is made at least partly of a transparent material. In particular, the secondary loading and/or unloading opening is embodied as a flap, in particular as a door.

In addition, it is proposed that the storage unit comprises a locking device, which is configured, in a state when the loading device is docked at the installation, to lock a closure unit that closes the secondary loading and/or unloading opening. In this way a high level of operational reliability is advantageously achievable. It is advantageously possible to prevent an operator from access to the interior of the storage unit during an active loading operation carried out by the handling robot. In particular, it is conceivable that the locking device automatically locks the secondary loading and/or unloading opening as soon as a measurement signal of the docking sensor signals successful docking. It is in particular conceivable that the locking device automatically locks the secondary loading and/or unloading opening as soon as the primary loading and/or unloading opening is opened and/or while the primary loading and/or unloading opening is opened.

It is further proposed that the rollable undercarriage unit comprises a coupling apparatus for a coupling with a driven, preferably autonomously driving, transport device. This in particular enables an especially advantageous providing of the tool holders and/or of the tool assemblies for the installation that is operated by the handling robot. Advantageously a high degree of efficiency and/or of operator-safety is achievable.

If, viewed relative to the put-up direction, at least a large portion of the coupling apparatus is arranged on an underside of the rollable undercarriage unit, particularly simple and/or advantageous coupling of the loading device with the transport device is achievable. In particular, the coupling apparatus comprises an opening which the, in particular autonomous, transport device rolling on a floor can drive/be driven into. In particular, the opening is implemented between (twice) two wheels, which are arranged on opposite-situated sides of the rollable undercarriage unit. In particular, the coupling apparatus comprises a surface for contacting the transport device, which is arranged on an underside of the rollable undercarriage unit. In particular, it is conceivable that the transport device lifts the entire rollable undercarriage unit, the entire weight of the loading device being thus supported completely by the wheels of the transport device, or that the transport device merely couples with the rollable undercarriage unit while pushing and/or pulling the rollable undercarriage unit which is still supported on its own wheels. It is in particular conceivable that the transport device is coupled with the underside of the rollable undercarriage unit via a magnetic coupling or via a mechanical coupling (abutments, grippers, latch connections, etc.).

Furthermore, a loading system is proposed, with the loading device and with at least one tool holder arranged in the loading device, with at least one tool assembly arranged in the loading device and/or with at least one tool which is arranged in the loading device, and a transport system is proposed, with the loading device or with the loading system, and with an autonomous or remote-controlled transport device which is operatively couplable with the loading device and is operatively separable from the loading device. This allows achieving advantageous installation-loading characteristics and/or advantageous transport characteristics for tool holders, tools and/or tool assemblies. The term "operatively" is in particular to mean during regular operation.

Moreover the installation, in particular the multi-clamping and measuring and/or presetting station and/or the machine tool, with the loading device and with at least one lock unit implementing the place designated for docking, is proposed. In this way advantageous installation-loading characteristics and/or advantageous docking characteristics are achievable. In particular, the installation comprises the handling robot. Preferably the installation comprises at least two mutually independent lock units. This advantageously allows achieving a high cycle rate, for example as the handling robot has access to a storage unit of a loading device which is arranged in a first lock unit of the installation, while a further storage unit in a (further) loading device at the same time docks at a second lock unit of the installation or is docked off the second lock unit of the installation.

Beyond this a method for loading the installation, in particular the multi-clamping and measuring and/or presetting station and/or the machine tool, by means of the loading device, is proposed, wherein in at least one docking step a connection is established between interfaces of the loading device and of the installation and, in an opening step following the docking step, an opening of a closure unit closing the loading and/or unloading opening of the loading device, in particular of the drive unit opening or closing the closure unit, is controlled via the connected interface and/or is supplied with drive energy via the connected interface. As a result, a high level of operational reliability and/or of operator-safety is advantageously achievable.

It is moreover proposed that in at least one identification step carried out before a first removal of a tool holder out of the loading device, all tool holders arranged in the loading device are identified by a sensor of the installation, and preferably their position is registered. In this way advantageously a high degree of automatization is obtainable and/or erroneous operation can be excluded. In particular, the sensor of the installation may be implemented as a camera carrying out an automatic recognition of tool holders, tools and/or tool assemblies either on the basis of their shapes or by identification elements assigned to tool holders, tools and/or tool assemblies, as an RFID reader that reads out RFID chips assigned to tool holders, tools and/or tool assemblies, as a barcode scanner that reads out barcodes or QR codes or the like, which are assigned to the tool holders, tools and/or tool assemblies, or as something like that. Alternatively it is also conceivable that the storage unit, in particular the holding device, comprises a place coding which is handed over to the installation, for example when docking or when identifying the loading device or at another point in time.

It is further proposed that the tool holders are allocated to different tool-chuck type categories in the identification step, wherein each tool holder is allocated to one of the tool-chuck type categories on the basis of the respectively used tool clamping technology, and wherein in feeding steps the categorized tool holders are in each case inserted by the handling robot in a suitable tool-clamping station of a plurality of tool-clamping stations of the multi-clamping and measuring and/or presetting station, or wherein in alternative feeding steps the categorized tool holders are in each case inserted by the handling robot in a suitable tool place of a plurality of tool places of the machine tool. In this way an effective and operationally safe automatization of the clamping-in and/or clamping-out process of tools into/out of different types of tool holders in a single installation, or an effective and operationally safe loading of a machine tool that uses different tools (tool assemblies) are/is advantageously enabled.

It is also proposed that in at least one loading step a tool holder supported in the storage unit in an oblique position and/or a tool assembly supported in the storage unit in an oblique position is gripped by a handling robot of the installation on an underside of the tool holder and/or of the tool assembly and is removed out of the loading device. In this way in particular an especially advantageous providing of the tool holders and/or of the tool assemblies for the installation that is operated by the handling robot is achievable. In particular, this enables a providing of the tool holders and/or of the tool assemblies that is particularly advantageous for a cinematic of the handling robot, in particular while at the same time maximizing a capacity of the storage unit. For example, in an implementation of the tool holder as an SK tool chuck, the underside of the tool holder comprises a tensioning bolt, by which the handling robot grips the tool holder (on its outer circumference) for a removal out of the storage unit or for a laying it into the storage unit. For example, in an implementation of the tool holder as an HSK tool chuck, the underside of the tool holder has a recess, by whose inner walls the handling robot grips the tool holder for a removal out of the storage unit or for laying it into the storage unit.

The loading device according to the invention, the loading system according to the invention, the transport system according to the invention, the installation according to the invention and the method according to the invention shall herein not be limited by the application and implementation described above. In particular, for the purpose of fulfilling a functionality that is described here, the loading device according to the invention, the loading system according to the invention, the transport system according to the invention, the installation according to the invention and the method according to the invention may comprise a number of individual elements, components, method steps and units that differs from a number given here.

DRAWINGS

Further advantages will become apparent from the following description of the drawings. In the drawings an exemplary embodiment of the invention is illustrated. The drawings, the description and the claims contain a plurality of features in combination. Someone skilled in the art will purposefully also consider the features separately and will find further expedient combinations.

Figure 2:
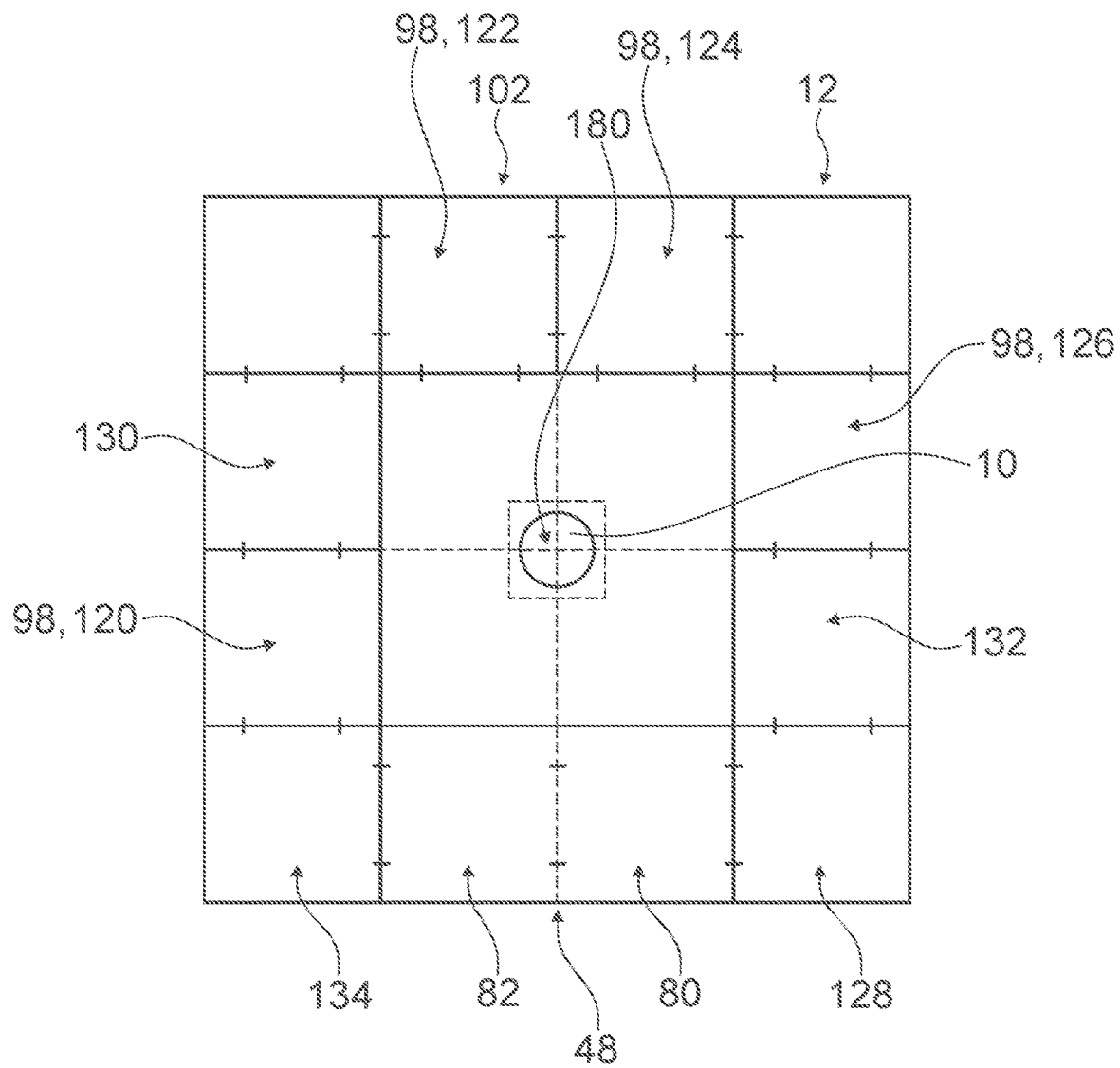
Figure 3:
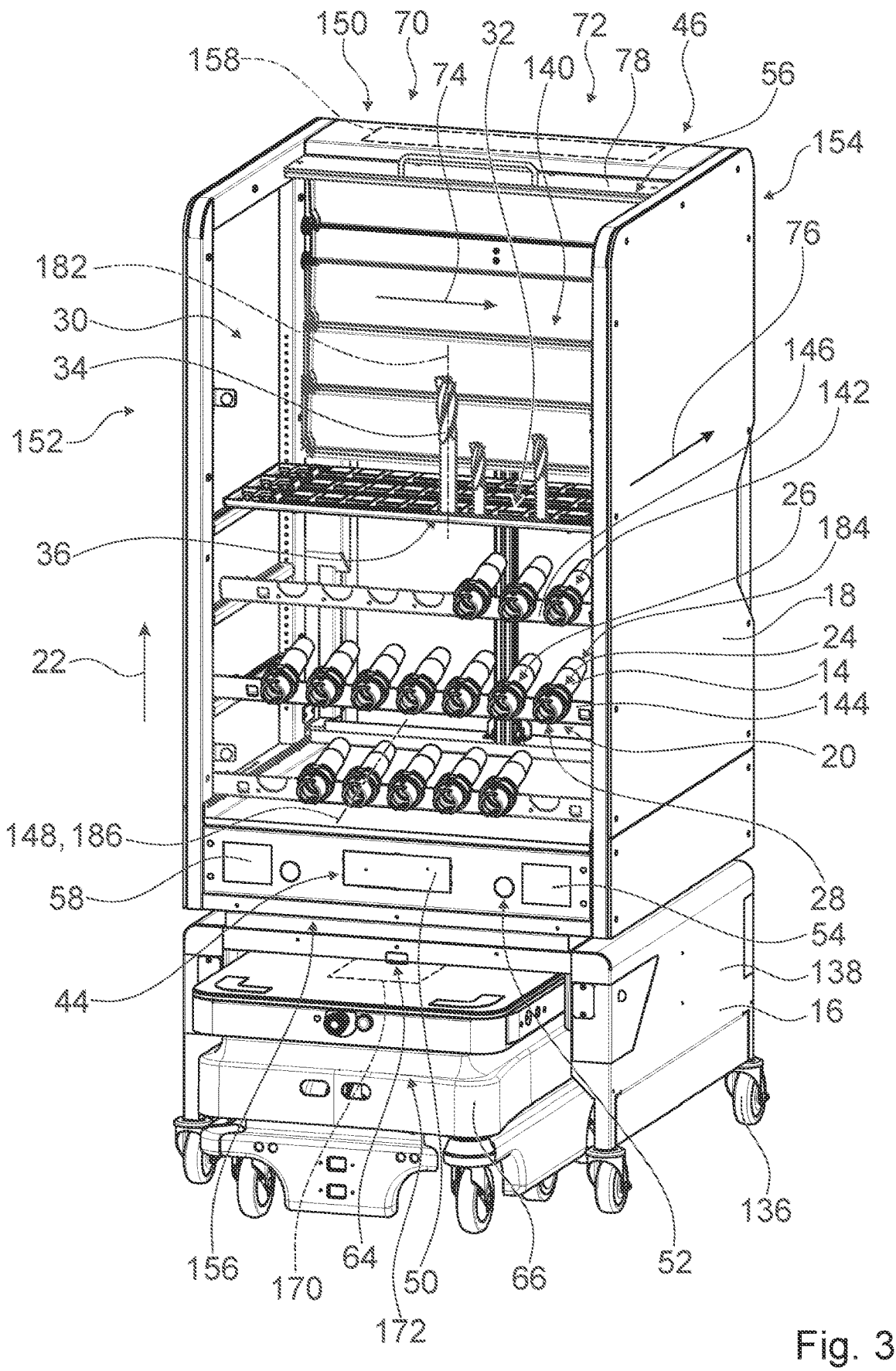
Figure 4:
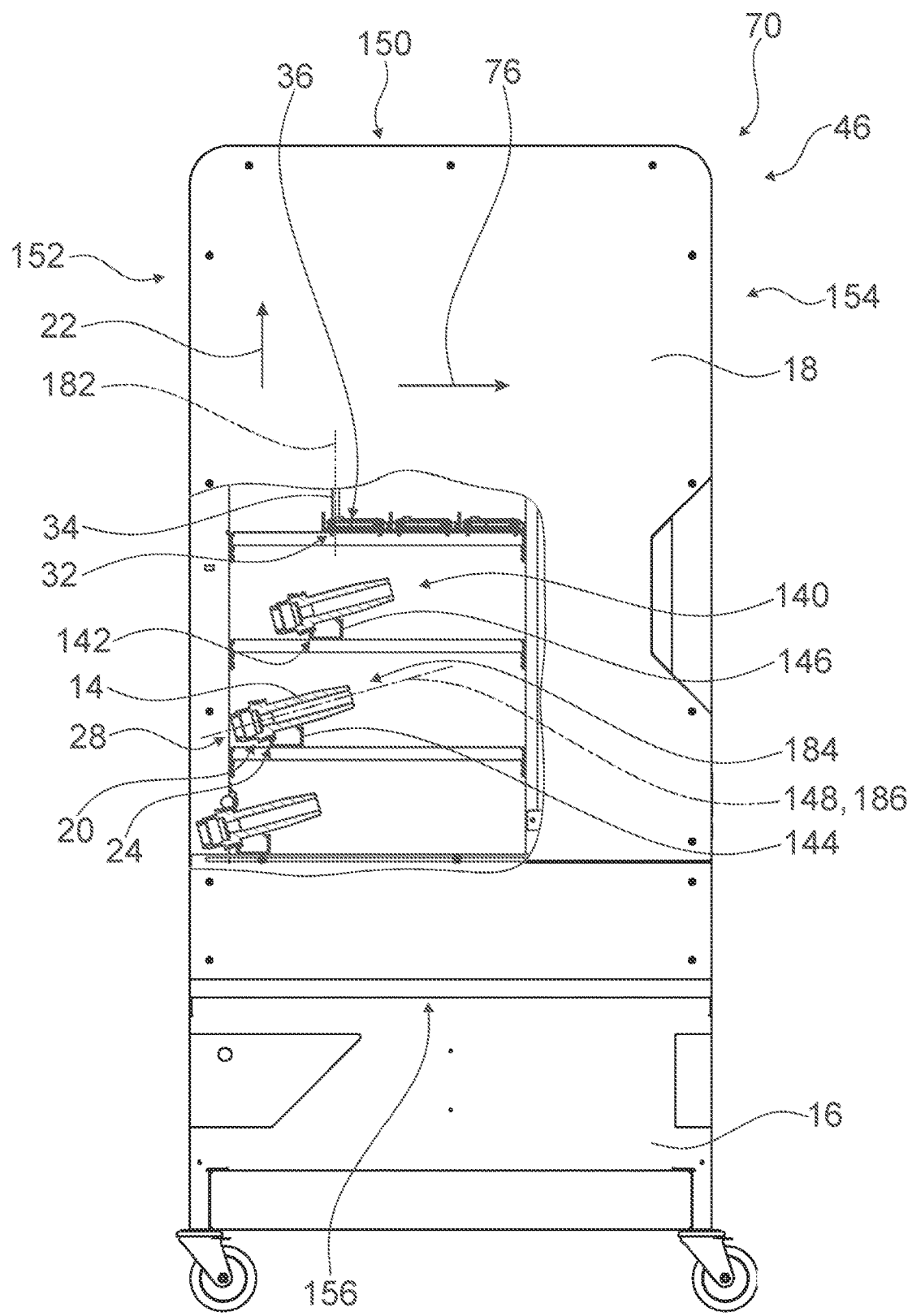
Figure 5:
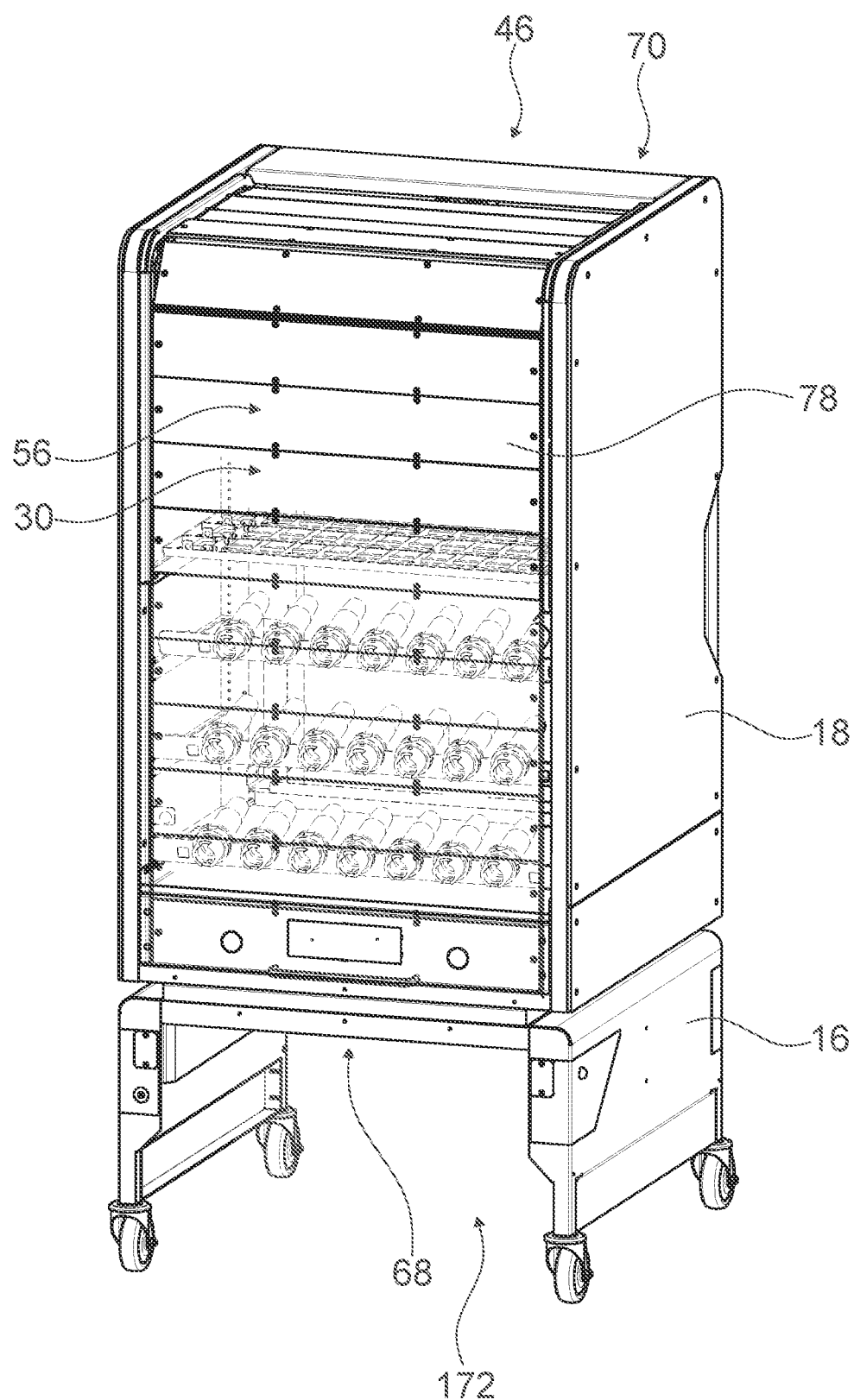
Figure 6:
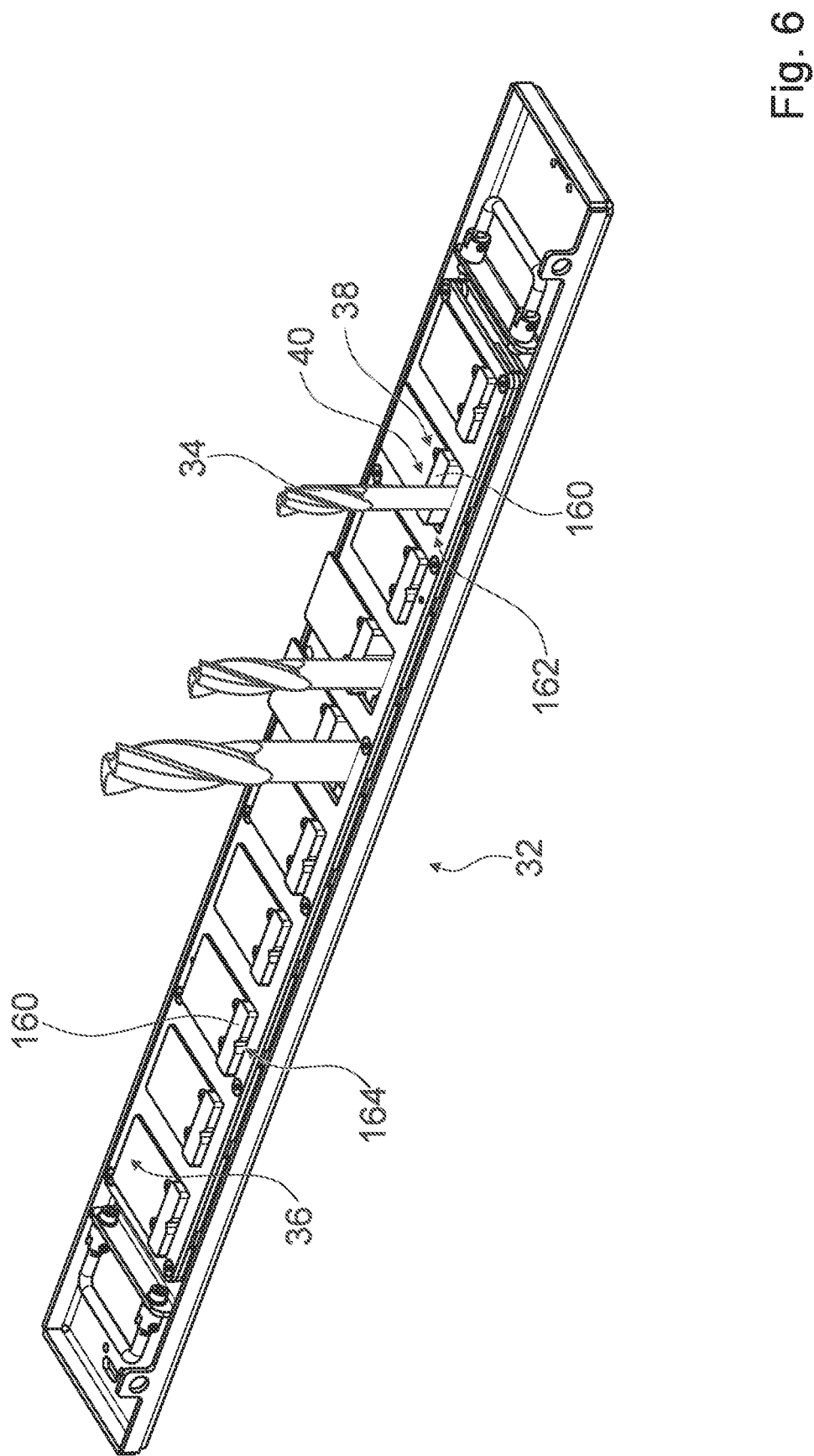
Figure 7:
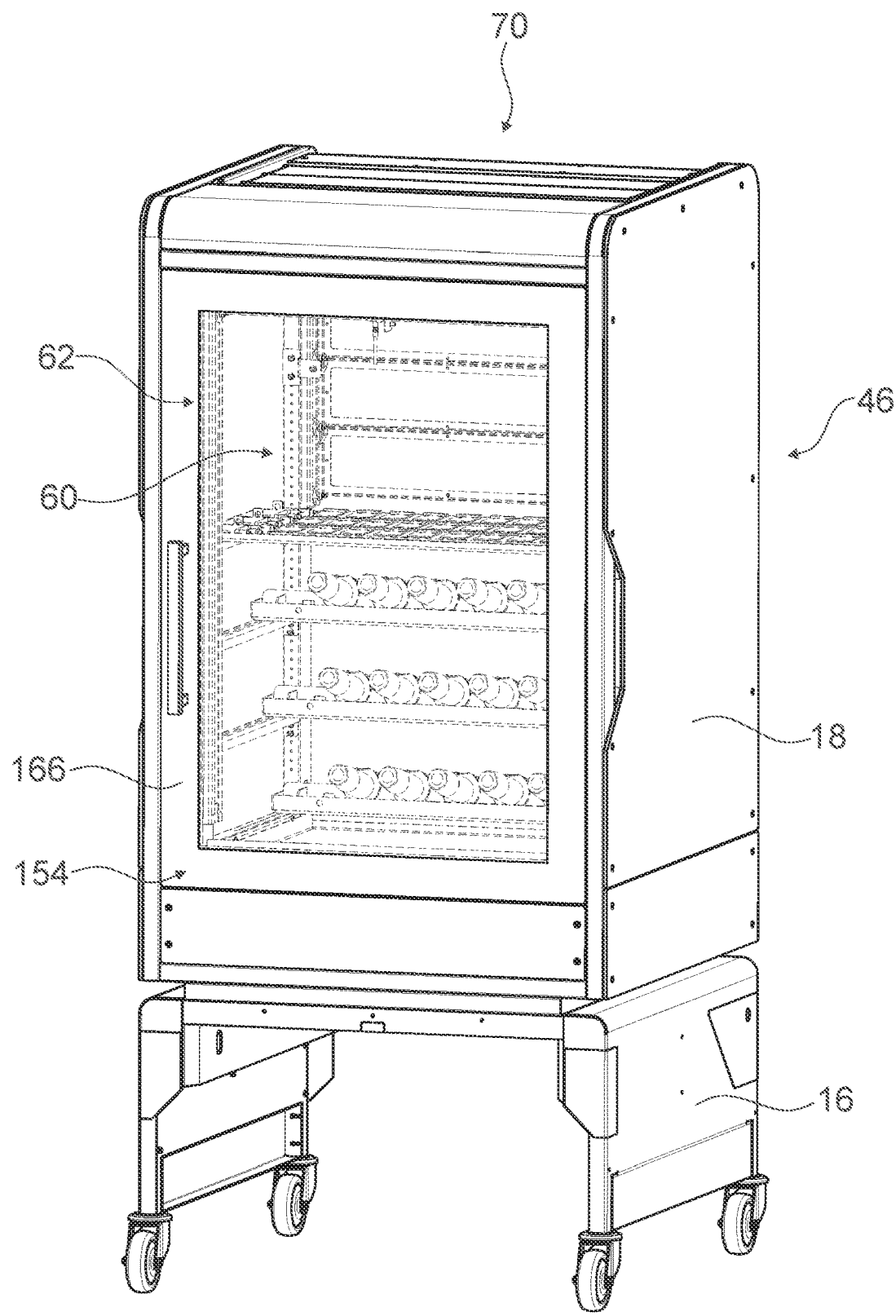
Figure 8:
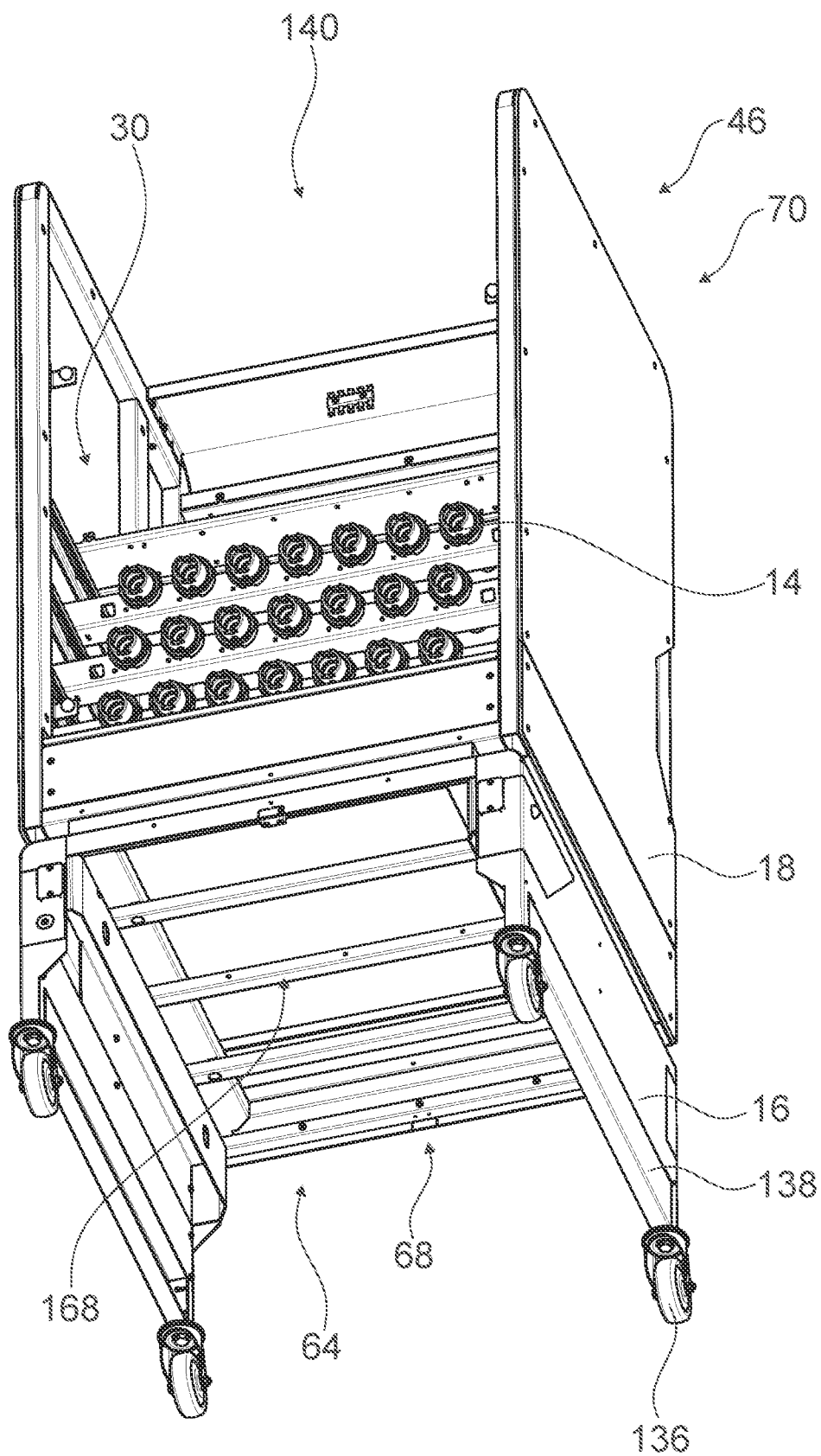
Figure 9:
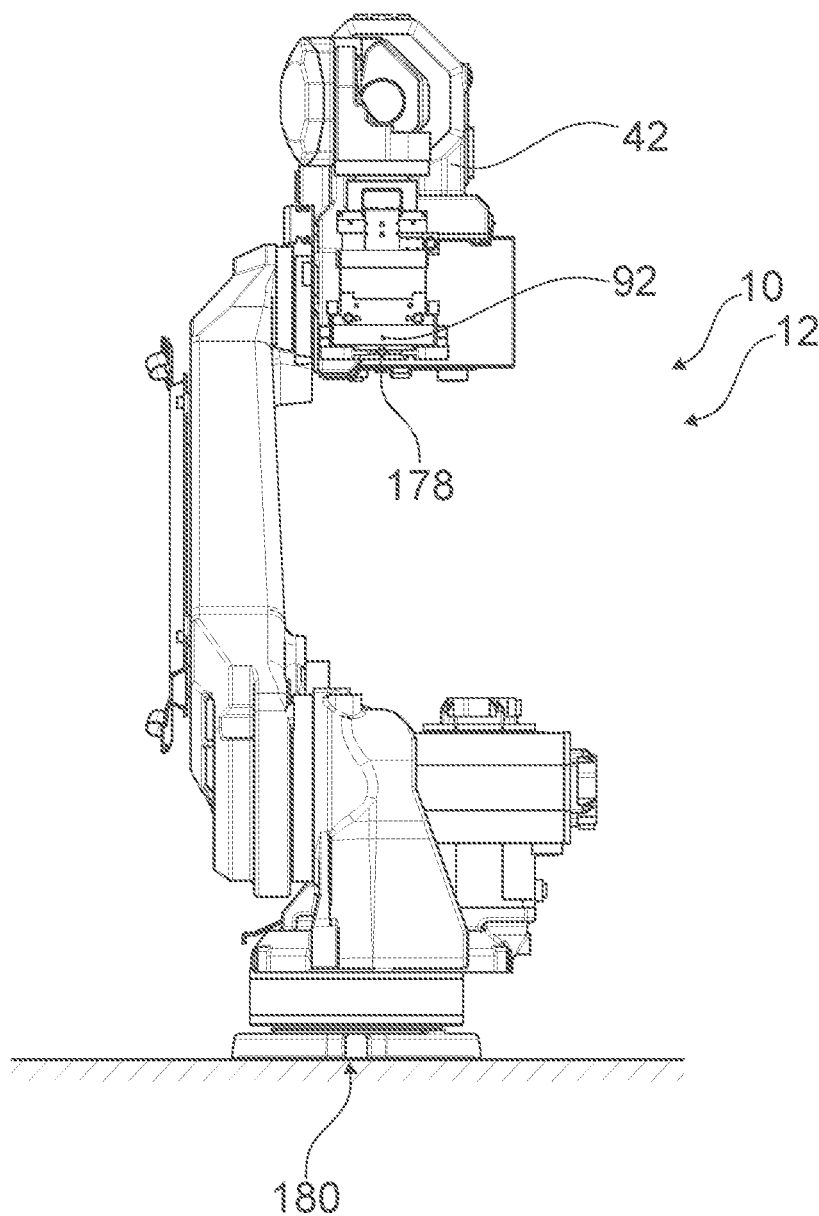
Figure 10:
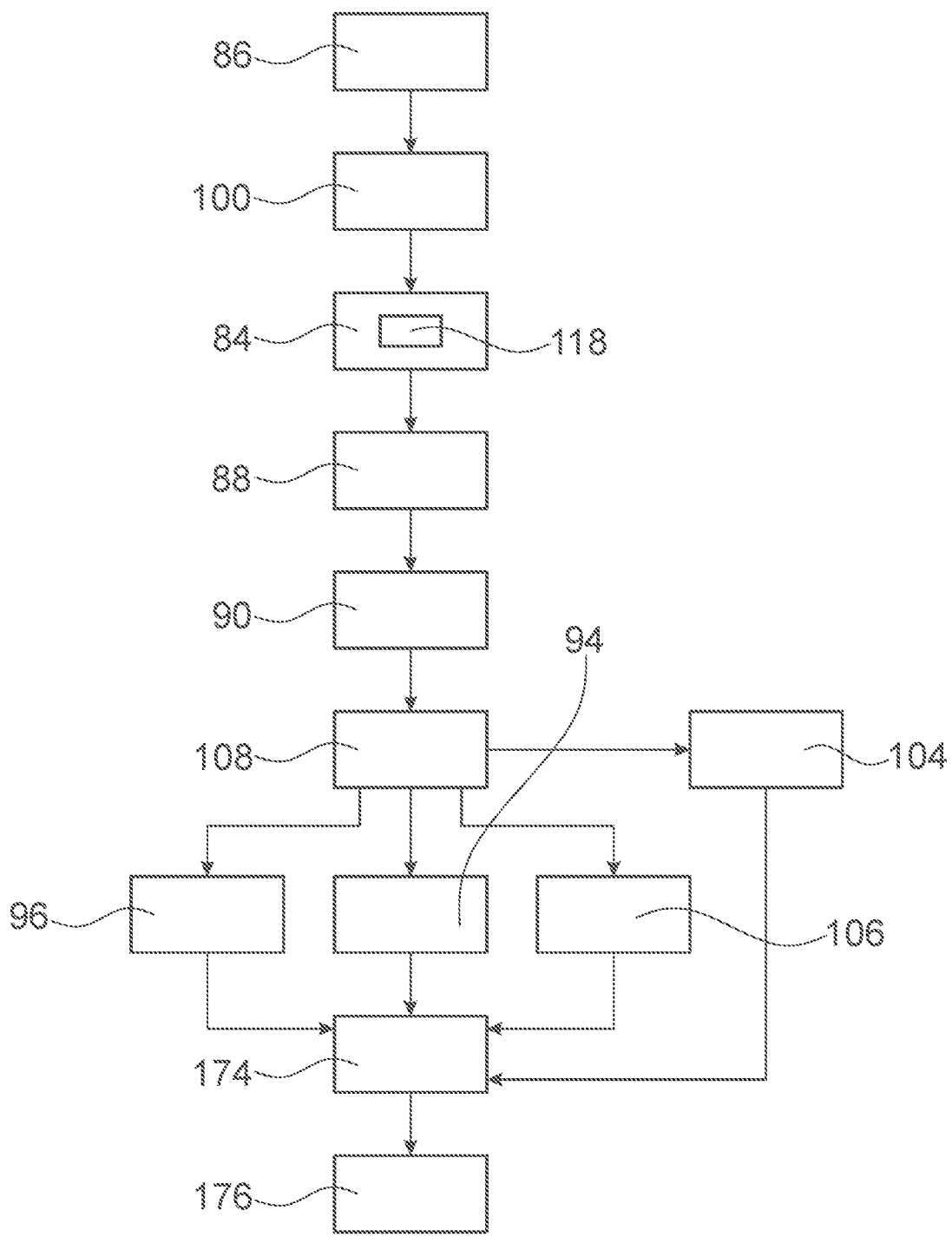

It is shown in:

FIG. 1 a schematic illustration of an installation with a loading device,

FIG. 2 a schematic construction of an installation implemented as a multi-clamping and measuring and/or presetting station, FIG. 3 a schematic perspective view of a front side of a transport system and of a loading system with the loading device, in an open state, FIG. 4 a schematic sectional view through the loading system with the loading device and with tool holders, FIG. 5 a schematic perspective view of a front side of the loading system with the loading device, in a closed state, FIG. 6 a schematic perspective view of a further holding device for tools of the loading device, FIG. 7 a schematic perspective view of a rear side of a transport system and of a loading system with the loading device, FIG. 8 a schematic view of an underside of the loading device, FIG. 9 a schematic view of a handling robot of the installation that is implemented as a multi-clamping and measuring and/or presetting station, and FIG. 10 a schematic flow chart of a method for loading the installation.

DESCRIPTION OF THE EXEMPLARY EMBODIMENT

FIG. 1 shows a schematic illustration of an installation 12. The installation 12 is implemented as a multi-clamping and measuring and/or presetting station 102. Alternatively, the installation 12 could as well be implemented as a machine tool (not shown) or the like. The installation 12 comprises a loading device 46. The loading device 46 is embodied as a mobile storage system for tools 34 and tool holders 14 (see FIG. 3). It is conceivable that an installation 12 comprises several loading devices 46, which are implemented at least substantially identically to one another. The installation 12 comprises a first lock unit 80. The installation 12 comprises a second lock unit 82. The lock units 80, 82 respectively form a place 48 of the installation 12 which is configured for a docking of loading devices 46. The lock units 80, 82 are in each case implemented to be closable towards an outside by means of cover units 110 of the installation 12. Each of the lock units 80, 82 is configured at least for a partial accommodation of one of the loading devices 46. Preferably the opening measurements of the lock units 80, 82 approximately correspond to the external measurements of the loading devices 46. The installation 12 comprises an operating panel 112, which is configured at least for a controlling of the lock units 80, 82 and/or of further components of the installation 12. The installation 12 further comprises a maintenance access 114, which is realized separately from the lock units 80, 82. FIG. 1 furthermore shows a transport system 72 with the loading device 46 and with an autonomous or remote-controlled transport device 66, which is operatively couplable with the loading device 46 and is operatively separable from the loading device 46.

FIG. 2 shows a schematic construction of the installation 12, which is implemented as a multi-clamping and measuring and/or presetting station 102. The installation 12 comprises an enclosure 116 (see FIG. 1) enclosing all (immobile) components of the installation 12 which are mentioned below. The installation 12 comprises a handling robot 10. The handling robot 10 is positioned in a central position of the installation 12, from which an access to all below-mentioned devices of the installation 12 is facilitated for the handling robot 10. The handling robot 10 is configured for an automated loading of all individual devices of the installation 12 with tools and/or tool holders 14. The handling robot 10 is configured for a loading of the loading device 46 with tools 34 and/or with tool holders 14. If the installation 12 is embodied as a machine tool, the handling robot 10 may, for example, be also configured for a loading of a processing apparatus of the machine tool with tool assemblies. The handling robot 10 is configured for a removal of tools 34 and/or tool holders 14 out of the loading device 46. The handling robot 10 is configured for a removal of tools 34 and/or tool holders 14 from the individual devices of the installation 12. The installation 12 comprises tool-clamping stations 98 for an at least semi-automated clamping of tools 34 in tool holders 14 and/or for an at least semi-automated unclamping of tools 34 out of tool holders 14. The installation 12 comprises several different tool-clamping stations 98 for different clamping methods. The installation 12 comprises a shrink-clamping apparatus 120 for shrink chucks. The installation 12 comprises a hydraulic-expansion clamping apparatus 122 (a hydraulic-expansion screwing station) for hydraulic-expansion chucks. The installation 12 comprises a compression-clamping station 124 (for powRgrip® tool holders) for compression-clamp chucks. The installation 12 comprises a union-nut clamping station 126 (a union-nut screw-driving station) for tool chucks with union nuts. The installation 12 comprises a measuring and/or presetting apparatus 128 for an at least semi-automated presetting and/or optical measuring of tools 34 and/or tool holders 14. The installation 12 comprises a cooling device 130 for an automated cooling of tool holders 14 which were previously heated in a shrink-clamping process. The installation 12 comprises a tool-mounting device 132 for an automated mounting of multi-part tools 34. The installation 12 comprises a balancing station 134 for an at least semi-automated balancing of tool holders 14 with or without clamped-in tools 34.

FIG. 3 shows a schematic perspective view of the transport system 72. FIG. 3 shows a schematic perspective view of a loading system 70. The loading system 70 comprises the loading device 46. The loading system 70 comprises several tool holders 14, which are arranged in the loading device 46. The loading system 70 comprises several tools 34, which are arranged in the loading device 46. It is not shown but conceivable that the loading system 70 moreover comprises a tool assembly or several tool assemblies, which is/are arranged in the loading device 46.

The loading device 46 is configured for a loading of the installation 12 with the tool holders 14, the tools 34 and/or the tool assemblies. The loading device 46 is configured for providing the tool holders 14, tools 34 and/or tool assemblies for the handling robot 10 of the installation 12. The loading device 46 comprises a rollable undercarriage unit 16. The rollable undercarriage unit 16 has four wheels 136. The rollable undercarriage unit 16 has a frame 138. The wheels 136 are mounted to the frame 138. The loading device 46 comprises a storage unit 18. The storage unit 18 is configured for a storage of the tool holders 14, the tools 34 and/or the tool assemblies. The storage unit 18 forms a receiving space 140. The tools 34, tool holders 14 and/or tool assemblies accommodated in the storage unit 18 are positioned within the receiving space 140. The storage unit 18 is arranged on the rollable undercarriage unit 16. The storage unit 18 is fastened on the rollable undercarriage unit 16. The storage unit 18 is put upon the rollable undercarriage unit 16. The storage unit 18 has a put-up direction 22. The storage unit 18 is arranged in the put-up direction 22 above the rollable undercarriage unit 16.

The storage unit 18 comprises a holding device 20 for holding the tool holders 14 and/or the tool assemblies within the receiving space 140. The holding device 20 comprises a plurality of holding places 24, 26, 142, which are implemented identically to one another. Different holding places 24, 26 of the plurality of holding places 24, 26, 142 are arranged horizontally (perpendicularly to the put-up direction 22) side by side. Different holding places 24, 142 of the plurality of holding places 24, 26, 142 are arranged vertically (in the put-up direction 22) above one another. In order to form the holding places 24, 26, 142, the holding device 20 comprises holding rails 144, 146, which are implemented in a rake-like manner and are positioned horizontally in the receiving space 140. Several holding rails 144, 146 are arranged above one another in the receiving space 140. Within the receiving space 140, neighboring holding rails 144, 146 are offset from each other in a depth direction 76 of the storage unit 18. A lower-situated holding rail 144 of the holding device 20 lies closer to a loading and/or unloading opening 30 of the storage unit 18 than a holding rail 146 that is arranged above the holding rail 144. Within the receiving space 140, with increasing heights neighboring holding rails 144, 146 are offset in the depth direction 76 inwards (away from the loading and/or unloading opening 30) (see also FIG. 4). The depth direction 76 of the storage unit 18 extends horizontally between two sides of the storage unit 18, in particular between a front side 152 of the storage unit 18 and a rear side 154 of the storage unit 18. The depth direction 76 extends perpendicularly to the holding rails 144, 146 of the holding device 20. The holding rails 144, 146 of the holding device 20 are manually removable out of the storage unit 18 and/or exchangeable and/or arrangeable at a different height relative to the put-up direction 22 and/or at a different depth relative to the depth direction 76.

The storage unit 18 comprises the loading and/or unloading opening 30. The loading and/or unloading opening 30 is configured, in an open state, to permit access from outside to the receiving space 140 of the storage unit 18. The loading and/or unloading opening 30 is arranged on the front side 152 of the storage unit 18. The loading and/or unloading opening 30 is arranged on a long (wide) side of the storage unit 18. The loading and/or unloading opening 30 has a width that is approximately equivalent to a width of the storage unit 18 in a width direction 74 of the storage unit 18. The width direction 74 extends horizontally between two sides of the storage unit 18, in particular between two sides of the storage unit 18 different than the front side 152 and the rear side 154. The width direction 74 extends parallel to the holding rails 144, 146 of the holding device 20. The loading and/or unloading opening 30 has a height approximately corresponding to a height of the storage unit 18 in the put-up direction 22 of the storage unit 18. The loading and/or unloading opening 30 extends over a (large) portion of an upper side 150 of the storage unit 18. The loading and/or unloading opening 30 extends across an edge of the storage unit 18 from the front side 152 of the storage unit 18 to the upper side 150 of the storage unit 18. The put-up direction 22 runs, parallel to the front side 152 or the rear side 154 of the storage unit 18, from an underside 156 of the storage unit 18 to the upper side 150 of the storage unit 18.

The loading and/or unloading opening 30 has a closure unit 56. The closure unit 56 comprises at least one closure element 78. The closure element 78 is configured to optionally close, preferably cover, the loading and/or unloading opening 30. The closure element 78 is exemplarily embodied as a roller blind. The roller blind is openable toward the upper side 150 of the storage unit 18 and is closable toward the underside 156 of the storage unit 18. The loading and/or unloading opening 30 realizes a primary loading and/or unloading opening 30. The loading device 46 comprises a drive unit 158, which is configured to generate an opening movement of the closure element 78 and/or a closing movement of the closure element 78. The closure element 78 is transparent (see also FIG. 5).

FIG. 4 shows a schematic section through the loading system 70 with the loading device 46 and with the tool holders 14. The holding device 20, in particular the holding places 24, 26, 142 of the holding rails 144, 146, is/are configured to hold the tool holders 14 (and/or the tool assemblies) in an oblique position relative to the put-up direction 22 of the storage unit 18, in particular with respect to a longitudinal axis 148 of the tool holders 14 (and/or of the tool assemblies). Viewed from a direction running parallel to the width direction 74 of the storage unit 18, the longitudinal axis 148 of the tool holders 14 (and/or tool assemblies) supported in the holding device 20 extends obliquely, in particular at an angle, preferably at an acute angle (meaning an angle included by the put-up direction 22 and the longitudinal axis 148 and having a mathematically positive sense of rotation), relative to the put-up direction 22. The longitudinal axis 148 of the tool holder 14 extends parallel to an imaginary prolongation of a designated rotary axis 186 of the tool holder 14. The longitudinal axis 148 of the tool holder 14 extends from a center of an upper side 184 of the tool holder 14 to a center of an underside 28 of the tool holder 14. The longitudinal axis 148 of the tool holder 14 extends parallel to a longest edge of a smallest geometrical rectangular cuboid that just still completely encloses the tool holder 14. The holding device 20, in particular the holding places 24, 26, 142 of the holding rails 144, 146, is/are configured to hold the tool holders 14 (and/or the tool assemblies) in an oblique position relative to the depth direction 76 of the storage unit 18, in particular with respect to the longitudinal axis 148 of the tool holders 14 (and/or of the tool assemblies). Viewed from a direction that runs parallel to the width direction 74 of the storage unit 18, the longitudinal axis 148 of the tool holders 14 (and/or tool assemblies) supported in the holding device 20 runs obliquely, in particular at an angle, preferably at an acute angle (meaning an angle included between the depth direction 76 and the longitudinal axis 148 and having a mathematically positive sense of rotation), relative to the depth direction 76. The holding device 20, in particular the holding places 24, 26, 142 of the holding rails 144, 146, are configured to hold the tool holders 14 (and/or the tool assemblies) perpendicularly relative to the width direction 74 (see FIG. 3) of the storage unit 18, in particular with respect to the longitudinal axis 148 of the tool holders 14 (and/or of the tool assemblies). Viewed from a direction that runs parallel to the put-up direction 22, the longitudinal axis 148 of the tool holders 14 (and/or tool assemblies) supported in the holding device 20 extends perpendicularly to the width direction 74.

The holding places 24, 26, 142 of the holding device 20 are implemented in such a way that the underside 28 of the tool holder 14 laid into the holding device 20 and/or an underside of a tool assembly laid into the holding device 20 points partly toward the portion of the loading and/or unloading opening 30 that is arranged sidewise on the storage unit 18, in particular the portion of the loading and/or unloading opening 30 that is arranged on the front side 152 of the storage unit 18.

The holding places 24, 26, 142 of the holding device 20 are implemented in such a way that, in a state when appropriately arranged on the installation 12, the underside 28 of the tool holder 14 laid into the holding device 20 and/or the underside of a tool assembly laid into the holding device 20 points toward the handling robot 10.

The storage unit 18 comprises the further holding device 32 (see FIG. 3). The further holding device 32 is configured for an upright holding of tools 34 (which can be combined with the tool holders 14 held in the holding device 20 at the same time). A tool rotary axis 182 of the tools 34 held upright in the further holding device 32 extends parallel to the put-up direction 22. The tool rotary axis 182 of a tool 34 extends parallel to a longest edge of a smallest geometrical rectangular cuboid that just still completely encloses the tool 34. The further holding device 32 comprises holding places 36. The holding places 36 of the further holding device 32 are arranged in the put-up direction 22 above the holding places 24, 26, 142 of the holding device 20. The holding places 36 of the further holding device 32 are arranged in a manner that permits the handling robot 10 to grip the tools 34 from the upper side 150 of the storage unit 18. The holding places 36 of the further holding device 32 are arranged in several rows behind one another. The rows of holding places 36 of the further holding device 32 are all arranged at a same height level relative to the put-up direction 22. The individual rows of holding places 36 of the further holding device 32 are manually removable out of the storage unit 18 and/or exchangeable and/or arrangeable at a different height level relative to the put-up direction 22.

FIG. 6 shows a schematic perspective view of a row of holding places 36 of the further holding device 32. The holding places 36 of the further holding device 32 comprise universally loadable tool snap-holders 38. The tool snap-holders 38 in each case comprise a clamping mechanism 40 for a positionally fix and oriented fixation of the respective tool 34 in the respective holding place 36 of the further holding device 32. The clamping mechanism 40 comprises a clamping element 160. The clamping element 160 is arranged within a recess 162 and is pre-tensioned in a direction, preferably in a horizontal direction, preferentially in the depth direction 76. The clamping element 160 is clamped, for example, by means of a mechanical spring. The clamping element 160 has an orientation element 164 in the pre-tension direction. The orientation element 164 is implemented as a prism-shaped vertically-extending furrow. The clamping mechanism 40 is configured to clamp a tool shaft of a tool 34 in a proximity of the orientation element 164, between an edge of the recess 162 and the clamping element 160. The clamping mechanism 40, in particular a movement of the clamping element 160 within the recess 162, can be operated via a movement of a robot arm 42 (see FIG. 9) of the handling robot 10 along a movement path of the robot arm 42.

The loading device 46 comprises a docking device 44 (see FIG. 3). The docking device 44 is configured for an at least semi-automated and/or sensor-controlled docking of the loading device 46, in particular the storage unit 18 and/or the rollable undercarriage unit 16, at the place 48 of the installation 12 designated for docking (see FIG. 1). The docking device 44 is configured for a docking at the lock units 80, 82. The docking device 44 comprises a docking sensor 50. The docking sensor 50 is configured to detect a correct docking of the loading device 46 relative to the installation 12, in particular at the lock units 80, 82. The docking sensor 50 is exemplarily embodied as a proximity sensor. The docking sensor 50 is configured to output a measurement signal, on the basis of which it can be determined whether the loading device 46 is positioned in a docking region of the installation 12, in particular in the place 48 of the installation 12 that is designated for docking. The closure unit 56 comprises a locking unit (not shown). The locking unit is configured for locking the closure element 78, at least in a closed state. The locking state of the closure unit 56 depends on the measurement signal of the docking sensor 50. Upon detection of a positioning of the loading device 46 in the docking region of the installation 12, in particular in the place 48 of the installation 12 designated for docking, the closure unit 56 is automatically unlocked. Upon detection of a positioning of the loading device 46 that deviates from the docking region of the installation 12, in particular from the place 48 of the installation 12 designated for docking, the closure unit 56 is automatically locked and/or the closure unit 56 remains locked.

The docking device 44 comprises an interface 54. The interface 54 is arranged on the storage unit 18. Alternatively the interface 54 could also be arranged on the rollable undercarriage unit 16. The interface 54 is embodied as an electrical or pneumatic interface. The interface 54 is configured for a transmission of a drive energy for an opening and/or closing movement of the closure element 78 that closes the loading and/or unloading opening 30 of the storage unit 18. The interface 54 is configured for a transmission of a drive energy to the drive unit 158, which that is integrated in the storage unit 18 or in the rollable undercarriage unit 16. The interface 54 is configured for an external controlling of an opening and/or closing movement of the closure unit 56, in particular of the drive unit 158 driving the opening and/or closing movement of the closure element 78. The installation 12 comprises an interface (not shown). The interface 54 of the loading device 46 is in the docked state connected to the interface of the installation 12.

The docking device 44 comprises an identification element 58. The identification element 58 is configured for an automatic identification of the respective loading device 46 that is approaching the installation 12, in particular the lock units 80, 82, by the installation 12. The identification element 58 is integrated in the storage unit 18 or in the rollable undercarriage unit 16 or is attached to the storage unit 18 or to the rollable undercarriage unit 16. By way of example, the identification element 58 is embodied as an RFID chip. The installation 12 in its turn comprises a read-out element (not shown), for example an RFID reader, which is configured to read out the identification element 58.

The docking device 44 comprises a fixation unit 52. The fixation unit 52 is configured to fix the rollable undercarriage unit 16 and/or the storage unit 18, when docking at the installation 12, in the place 48 of the installation 12 that is designated for docking. The docking device 44 is exemplarily embodied as a magnet, in particular a permanent magnet or an electromagnet, which is configured to interact with a magnet unit (not shown) of the installation 12.

FIG. 7 shows a schematic view of the rear side 154 of the loading device 46. The storage unit 18 has, in addition to the primary loading and/or unloading opening 30, a secondary loading and/or unloading opening 60. The storage unit 18 comprises a locking device (not shown), which is configured, in a state when the loading device 46 is docked at the installation 12, to lock a closure unit 62 that closes the secondary loading and/or unloading opening 60, in particular a further closure element 166 of the storage unit 18 that is configured for closing the secondary loading and/or unloading opening 60. The secondary loading and/or unloading opening 60 is manually openable and closable via the further closure element 166 of the storage unit 18. The further closure element 166 is exemplarily embodied as a door flap. The further closure element 166 is implemented transparent.

FIG. 8 shows a schematic view of the underside 156 of the loading device 46, in particular of the rollable undercarriage unit 16. The rollable undercarriage unit 16 comprises a coupling apparatus 64. The coupling apparatus 64 is configured for a coupling with the driven, autonomously driving transport device 66 (see also FIG. 1). Viewed relative to the put-up direction 22, the coupling apparatus 64 is arranged on an underside 68 of the rollable undercarriage unit 16. In the case that is shown in FIG. 8 by way of example, the coupling apparatus 64 comprises for the purpose of generating a coupling force a coupling magnet 168 for an interaction with a corresponding magnet unit 170 of the transport device 66 (see FIG. 3). Alternative implementations, e. g. mechanical or other implementations, of the coupling apparatus 64 are conceivable. The coupling apparatus 64, in particular the rollable undercarriage unit 16, forms a drive-under opening 172, which is configured to accommodate the transport device 66. The transport device 66 is configured to drive below the loading device 46 and to couple with the loading device 46 for a transmission of a movement energy from the transport device 66 to the loading device 46. The loading device 46 has a base area of maximally 1,200 mm*800 mm (EUR pallet). The loading device 46 has a height of less than 2 m, preferably less than 1.5 m.

FIG. 9 shows a schematic view of the handling robot 10. The handling robot 10 comprises the robot arm 42. The handling robot 10 comprises a gripper unit 178 for gripping the tools 34, the tool holders 14 and/or the tool assemblies. The handling robot 10 is arranged in a center 180 of the multi-clamping and measuring and/or presetting station 102 (see FIG. 2). The handling robot 10 has access to all individual stations of the multi-clamping and measuring and/or presetting station 102. The handling robot 10 comprises an integrated sensor 92. Alternatively it is conceivable that the sensor 92 is realized separately from the handling robot 10 and can be gripped by the handling robot 10 temporarily for a readout of the contents of the loading device 46. The sensor 92 of the handling robot 10 is embodied as a camera (with illumination). The sensor 92 of the handling robot 10 is configured to identify the tool holders 14, tools 34 and/or tool assemblies arranged in the loading device 46, in particular by camera image recognition or by reading out a OR code or the like arranged on the respective tool holder 14 and/or on the respective tool 34. The sensor 92 of the handling robot 10 is configured to register the positions of the tool holders 14, tools 34 and/or tool assemblies, in particular by camera image recognition.

FIG. 10 shows a schematic flow chart of a method for loading the installation 12, in particular the multi-clamping and measuring and/or presetting station 102 and/or a machine tool, by the loading device 46. In at least one method step 86 the loading device 46, which is loaded with a plurality of tool holders 14 and with a plurality of tools 34 and is locked, gets coupled with the transport device 66. For this purpose the transport device 66 drives into the drive-under opening 172 of the rollable undercarriage unit 16 and creates a coupling with the loading device 46 via the coupling apparatus 64. In at least one further method step 100 the loading device 46 is conveyed to the installation 12, In at least one docking step 84 the loading device 46 is docked at a lock unit 80, 82 of the installation 12. In the docking step 84 a connection is established between the interfaces 54 of the loading device 46 and of the installation 12. In at least one substep 118 of the docking step 84 the docking process is monitored by the docking sensor 50. Upon detection of a successful docking, a corresponding measurement signal is emitted by the docking sensor 50. Upon detection of a successful docking, the closure element 78 is unlocked. Upon detection of a successful docking, the further closure element 166, which closes the secondary loading and/or unloading opening 60, is locked. In an opening step 88 following the docking step 84, an opening of the closure element 78, which closes the loading and/or unloading opening 30 of the loading device 46, is controlled via the connected interfaces 54. In the opening step 88 the drive unit 158 that brings about the opening is supplied with drive energy via the connected interfaces 54.

In at least one identification step 90 carried out before a first removal of a tool holder 14 out of the loading device 46, all the tool holders 14 arranged in the loading device 46 are identified by the sensor 92 of the installation 12. In the identification step 90 the positions of the tool holders 14 which are arranged in the loading device 46 are registered. In the identification step 90 the tool holders 14 are allocated to different tool-chuck type categories. Herein each tool holder 14 is allocated to one of the tool-chuck type categories on the basis of the respectively used tool-clamping technology. Then, in at least one loading step 108, one of the tool holders 14 supported in the storage unit 18 in an oblique-positioned manner, and/or one of the tool assemblies supported in the storage unit 18 in an oblique-positioned manner is gripped by the handling robot 10 of the installation 12 at the underside 28 of the tool holder 14 and/or of the tool assembly and is removed out of the loading device 46. In one or several feeding steps 94, 96 the categorized tool holders 14 are in each case inserted by the handling robot 10 into a suitable tool-clamping station 98 of a plurality of tool-clamping stations 120, 122, 124, 126 of the multi-clamping and measuring and/or presetting station 102 or into the measuring and/or presetting apparatus 128, the cooling device 130, the took mounting device 132 or the balancing station 134. In the case of a machine tool, in alternative feeding steps 104, 106 the categorized tool holders 14 or the categorized tool assemblies are in each case inserted by the handling robot 10 into a suitable tool place of a plurality of tool places of the machine tool.

In at least one further method step 174 tool holders 14 and/or tools 34 are inserted into the holding devices 20, 32 of the loading device 46 by the handling robot 10. In at least one further method step 176 the filled loading device 46 is uncoupled from the lock unit 80, 82 and is removed out of the docking region (undocked). In the method step 176 the closure element 78 is closed and locked. In the method step 176 the closed and locked loading device 46 is transported away from the installation 12 by the transport device 66.

The invention claimed is:

1. A loading device for a loading of an installation and/or a machine tool with tool holders and/or tool assemblies, the loading device comprising a rollable undercarriage unit and comprising a storage unit, arranged on the rollable undercarriage unit, for a storage of the tool holders and/or of the tool assemblies, wherein the storage unit comprises at least one holding device at least for an oblique-positioned holding of the tool holders and/or of the tool assemblies relative to a put-up direction of the storage unit, wherein the put-up direction is a vertical direction that runs vertically from an underside of the storage unit to an upper side of the storage unit, wherein an angle of a rotary axis of a tool holder, of the tool holders, held in an oblique-positioned manner or of a tool assembly, of the tool assemblies, held in the oblique-positioned manner with respect to the put-up direction of the storage unit differs from 0° and differs from 90°, wherein the rotary axis of the tool holder or of the tool assembly is a rotary axis that is designated for a regular use of the tool holder or of the tool assembly, wherein the at least one holding device comprises at least three holding rails which are arranged above one another in a receiving space formed by the storage unit, wherein within the receiving space, neighboring holding rails are offset from each other in a depth direction of the storage unit in a way that with increasing heights above a bottom of the receiving space, the holding rails are offset in the depth direction further inwards away from a loading and/or unloading opening of the storage unit, and wherein the rollable undercarriage unit comprises a coupling apparatus for a coupling with an autonomously driving transport device.

2. The loading device according to claim 1, wherein the at least one holding device comprises at least one holding place, which is implemented in such a way that an underside of the tool holder laid into the at least one holding device and/or of the tool assembly laid into the at least one holding device points at least partly toward the loading and/or unloading opening of the storage unit, which is arranged at least partly laterally on the storage unit.

3. The loading device according to claim 2, wherein the at least one holding device comprises a plurality of holding places, which are implemented at least substantially identically to one another, wherein a first at least two holding places of the plurality of holding places are arranged at least substantially next to each other horizontally.

4. The loading device according to claim 1, wherein the storage unit comprises at least one further holding device at least for an upright holding of tools.

5. The loading device according to claim 4, wherein the at least one further holding device comprises at least one holding place, which is arranged in the put-up direction above a holding place of the at least one holding device.

6. The loading device according to claim 5, wherein the at least one holding place of the at least one further holding device comprises a tool snap-holder, which can be loaded with different tools having different shaft diameters.

7. The loading device according to claim 6, wherein the tool snap-holder comprises a clamping mechanism for a fixation of a tool of the tools in the holding place of the at least one further holding device, the clamping mechanism is operable via a movement of a robot arm of a handling robot along a movement path.

8. The loading device according to claim 1, further comprising a fully automated and/or sensor-controlled docking device for a docking of the loading device in a place of the installation that is configured for the docking.

9. The loading device according to claim 8, wherein the docking device comprises at least one docking sensor, which is configured to check whether the loading device is correctly positioned in a docking region of the installation, and wherein the at least one docking sensor is embodied as a camera, as a radar sensor, as a lidar sensor and/or as a contact sensor.

10. The loading device according to claim 9, wherein the storage unit comprises the loading and/or unloading opening is arranged at least partly sidewise on the storage unit, and comprises a lockable closure unit closing the loading and/or unloading opening, wherein a locking state of the closure unit depends on a measurement signal of the at least one docking sensor.

11. The loading device according to claim 8, wherein the docking device comprises a fixation unit that is arranged at least partly on the storage unit and/or on the rollable undercarriage unit and that comprises grippers, magnets, abutments or latch mechanisms for effecting a fixation, and wherein the fixation unit is configured, in a docking at the installation, to fix at least the rollable undercarriage unit and/or at least the storage unit in the place of the installation that is designated for the docking.

12. The loading device according to claim 8, wherein the docking device comprises at least one interface, which is configured at least for a transmission of a drive energy for an opening and/or closing movement of a closure unit that closes the loading and/or unloading opening of the storage unit, and/or for an external controlling of the opening and/or closing movement of the closure unit, wherein the storage unit, the rollable undercarriage or the installation comprises a drive motor for driving a movement of a closure element of the closure unit between an open state and a closed state, wherein a mobile part of the loading device is free of an energy source and/or free of a control unit for an energy supply and/or for a controlling of the drive motor, wherein the installation comprises at least one connection element, which is configured for a connection to the at least one interface for the transmission of the drive energy and/or of controlling signals for the drive motor, and wherein the installation comprises an energy source and/or a control unit, which is configured for an energy supply and/or for a controlling of the drive motor.

13. The loading device according to claim 8, wherein the docking device comprises at least one identification element, which is configured to permit automatic identification of the respective loading device by the installation.

14. The loading device according to claim 1, wherein the storage unit comprises, in addition to a primary loading and/or unloading opening, at least one manually openable and closable secondary loading and/or unloading opening.

15. The loading device according to claim 14, further comprising a fully automated and/or sensor-controlled docking device for a docking of the loading device in a place of the installation that is configured for the docking, wherein the storage unit comprises a locking device, which is configured, in a state when the loading device is docked at the installation, to lock a closure unit that closes the secondary loading and/or unloading opening.

16. The loading device according to claim 1, wherein viewed relative to the put-up direction, more than 50% of the coupling apparatus is arranged on an underside of the rollable undercarriage unit.

17. A method for loading an installation, comprising: loading a tool by the loading device according to claim 1.

18. The method according to claim 17, further comprising establishing, in at least one docking step, a connection between interfaces of the loading device and interfaces of the installation and controlling, in an opening step following the at least one docking step, an opening of a closure unit closing a loading and/or unloading opening of the loading device via the connected interfaces and/or being supplied with drive energy via the connected interfaces.

19. The method according to claim 17, further comprising identifying, in at least one identification step carried out before a first removal of a tool holder, of the tool holders, out of the loading device, all of the tool holders arranged in the loading device by a sensor of the installation, and registering positions of the tool holders.

20. The method according to claim 19, further, in the at least one identification step, allocating the tool holders to different tool-chuck type categories, wherein each tool holder, of the tool holders, is allocated to one of the tool-chuck type categories on the basis of respectively used tool-clamping technology, and inserting, in feeding steps, each of the categorized tool holders by a handling robot into a suitable tool-clamping station of a plurality of tool-clamping stations of a multi-clamping and measuring and/or presetting station, or inserting, in alternative feeding steps, each of the categorized tool holders by the handling robot into a suitable tool place of a plurality of tool places of the machine tool.

21. The method according to claim 17, further comprising gripping, in at least one loading step, a tool holder supported in the storage unit in an oblique position and/or a tool assembly supported in the storage unit in an oblique position by a handling robot of the installation on an underside of the tool holder and/or of the tool assembly and removing the tool holder and/or the tool assembly gripped by the handling robot out of the loading device.

22. The loading device according to claim 1, wherein the installation is embodied as a multi-clamping and measuring and/or presetting station for tools and/or tool holders.

23. The loading device according to claim 1, wherein the installation and/or the machine tool comprises at least one handling robot.

24. A transport system with a loading device for a loading of an installation and/or a machine tool with tool holders and/or tool assemblies, the loading device comprising a rollable undercarriage unit and comprising a storage unit, arranged on the rollable undercarriage unit, for a storage of the tool holders and/or of the tool assemblies, wherein the storage unit comprises at least one holding device at least for an oblique-positioned holding of the tool holders and/or of the tool assemblies relative to a put-up direction of the storage unit,
wherein the put-up direction is a vertical direction that runs vertically from an underside of the storage unit to an upper side of the storage unit, wherein an angle of a rotary axis of a tool holder, of the tool holders, held in an oblique-positioned manner or of a tool assembly, of the tool assemblies, held in the oblique-positioned manner with respect to the put-up direction of the storage unit differs from 0° and differs from 90°, and wherein the rotary axis of the tool holder or of the tool assembly is a rotary axis that is designated for a regular use of the tool holder or of the tool assembly, and with the transport system further comprising an autonomous driving transport device or a remote-controlled transport device which is operatively couplable with the loading device and is operatively separable from the loading device.

25. A loading device for a loading of an installation and/or a machine tool with tool holders and/or tool assemblies, the loading device comprising a rollable undercarriage unit and comprising a storage unit, arranged on the rollable undercarriage unit, for a storage of the tool holders and/or of the tool assemblies, wherein the storage unit comprises at least one holding device at least for an oblique-positioned holding of the tool holders and/or of the tool assemblies relative to a put-up direction of the storage unit, wherein the put-up direction is a vertical direction that runs vertically from an underside of the storage unit to an upper side of the storage unit, wherein an angle of a rotary axis of the tool holder held in an oblique-positioned manner or of the tool assembly held in the oblique-positioned manner with respect to the put-up direction of the storage unit differs from 0° and differs from 90°, and wherein the rotary axis of the tool holder or of the tool assembly is a rotary axis that is designated for a regular use of the tool holder or of the tool assembly, the loading device further comprising a fully automated and/or sensor-controlled docking device for a docking of the loading device in a place of the installation that is configured for a docking, wherein the docking device comprises at least one docking sensor, which is specially designed to check whether the loading device is correctly positioned in a docking region of the installation, and wherein the docking sensor is embodied as a camera, as a radar sensor, as a lidar sensor and/or as a contact sensor, and
wherein the storage unit comprises a loading and/or unloading opening, which is arranged at least partly sidewise on the storage unit, and comprises a lockable closure unit closing the loading and/or unloading opening, wherein a locking state of the closure unit depends on a measurement signal of the docking sensor.

26. A loading device for a loading of an installation and/or a machine tool with tool holders and/or tool assemblies, the loading device comprising a rollable undercarriage unit and comprising a storage unit, arranged on the rollable undercarriage unit, for a storage of the tool holders and/or of the tool assemblies, wherein the storage unit comprises at least one holding device at least for an oblique-positioned holding of the tool holders and/or of the tool assemblies relative to a put-up direction of the storage unit, wherein the put-up direction is a vertical direction that runs vertically from an underside of the storage unit to an upper side of the storage unit, wherein an angle of a rotary axis of the tool holder held in an oblique-positioned manner or of the tool assembly held in the oblique-positioned manner with respect to the put-up direction of the storage unit differs from 0° and differs from 90°, and wherein the rotary axis of the tool holder or of the tool assembly is a rotary axis that is designated for a regular use of the tool holder or of the tool assembly, the loading device further comprising a fully automated and/or sensor-controlled docking device for a docking of the loading device in a place of the installation that is configured for a docking,
wherein the docking device comprises at least one interface, which is configured at least for a transmission of a drive energy for an opening and/or closing movement of a closure unit that closes a loading and/or unloading opening of the storage unit, and/or for an external controlling of the opening and/or closing movement of the closure unit, wherein the storage unit, the rollable undercarriage or the installation comprises a drive motor for driving a movement of a closure element of the closure unit between an open state and a closed state, wherein a mobile part of the loading device is free of an energy source and/or free of a control unit for an energy supply and/or for a controlling of the drive motor, wherein the installation comprises at least one connection element, which is configured for a connection to the interface for the transmission of the drive energy and/or of controlling signals for the drive motor, and wherein the installation comprises an energy source and/or a control unit, which is configured for an energy supply and/or for a controlling of the drive motor.

* * * * *